(12) United States Patent
Legg et al.

(10) Patent No.: US 11,660,509 B2
(45) Date of Patent: May 30, 2023

(54) BALL RETRIEVAL SYSTEM AND METHOD

(71) Applicant: Court Bots, Inc., Miami, FL (US)

(72) Inventors: Lawrence George Legg, North Miami Beach, FL (US); Shane F. Legg, North Miami Beach, FL (US)

(73) Assignee: Court Bots, Inc., Miami, FL (US)

( * ) Notice: Subject to any disclaimer, the term of this patent is extended or adjusted under 35 U.S.C. 154(b) by 0 days.

(21) Appl. No.: 17/003,989

(22) Filed: Aug. 27, 2020

(65) Prior Publication Data

US 2021/0060391 A1    Mar. 4, 2021

Related U.S. Application Data

(63) Continuation-in-part of application No. 16/866,480, filed on May 4, 2020, which is a continuation-in-part
(Continued)

(51) Int. Cl.
*A63B 47/02*        (2006.01)
*A63B 24/00*        (2006.01)
(Continued)

(52) U.S. Cl.
CPC ........ *A63B 47/021* (2013.01); *A63B 24/0021* (2013.01); *A63B 61/00* (2013.01);
(Continued)

(58) Field of Classification Search
CPC .............. A63B 47/021; A63B 24/0021; A63B 61/00; A63B 71/0619; A63B 2024/0053;
(Continued)

(56) References Cited

U.S. PATENT DOCUMENTS 4,046,131 A  *  9/1977  Clark ................... A63B 69/409
                                                        124/53.5
4,077,533 A      3/1978  Meyer
(Continued)

FOREIGN PATENT DOCUMENTS

CN         107 007 996 A      8/2017
CN         107 198 870 A      9/2017

OTHER PUBLICATIONS

"Robot Odometry Correction Using Grid Lines on the Floor", P. Machler, Swiss Federal Institute of Technology, Lausanne, Switzerland, MCPA 1997 Pisa, Italy.
(Continued)

*Primary Examiner* — Jeffrey S Vanderveen
(74) *Attorney, Agent, or Firm* — L. George Legg

(57) ABSTRACT

A tennis ball retriever for retrieving a tennis ball on and about a tennis court and for controllably releasing the ball includes a front-end ball collector having two spaced-apart blades defining a ball collection space. The retriever includes a means for gripping and securing a ball positioned at the fore end, and one or more detents for retaining the collected ball in the collection space until a programmed or manually-directed release toward a target location such as a tennis baseline. The retriever includes a processor-controller for controlling and directing the retriever during a retrieval session. The retriever may be remote-controlled such as by voice commands.

21 Claims, 16 Drawing Sheets

Related U.S. Application Data of application No. PCT/US2019/060143, filed on Nov. 6, 2019.

(60) Provisional application No. 62/908,267, filed on Sep. 30, 2019, provisional application No. 62/756,450, filed on Nov. 6, 2018.

(51) Int. Cl.
*A63B 61/00* (2006.01)
*A63B 102/02* (2015.01)
*A63B 71/06* (2006.01)

(52) U.S. Cl.
CPC ... *A63B 71/0619* (2013.01); *A63B 2024/0053* (2013.01); *A63B 2047/022* (2013.01); *A63B 2102/02* (2015.10); *A63B 2220/805* (2013.01); *A63B 2220/806* (2013.01); *A63B 2220/808* (2013.01); *A63B 2225/20* (2013.01)

(58) Field of Classification Search
CPC .......... A63B 2047/022; A63B 2102/02; A63B 2220/805; A63B 2220/806; A63B 2220/808; A63B 2225/20; A63B 24/0003; A63B 71/022; A63B 71/0622; A63B 2024/0028; A63B 2071/0063; A63B 2071/025; A63B 2071/0625; A63B 2071/0655; A63B 2071/068; A63B 2071/0683; A63B 2071/0694; A63B 2220/05; A63B 2220/12; A63B 2220/20; A63B 2220/24; A63B 2220/34; A63B 2220/40; A63B 2220/44; A63B 2220/801; A63B 2220/802; A63B 2220/803; A63B 2220/807; A63B 2220/833; A63B 2225/02; A63B 2225/50; A63B 2225/54; A63B 2225/74

See application file for complete search history.

(56) References Cited

U.S. PATENT DOCUMENTS

| | | | |
|---|---|---|---|
| 5,048,832 | A | 9/1991 | Kaminkow |
| 6,176,230 | B1 | 1/2001 | Thompson |
| 6,691,691 | B1 | 2/2004 | Beynon et al. |
| 7,203,693 | B2 | 4/2007 | Carlbom et al. |
| 9,089,742 | B2 * | 7/2015 | Vilar ................... A63B 47/025 |
| 9,212,067 | B2 | 12/2015 | Gellibolian et al. |
| 9,339,716 | B1 | 5/2016 | Ward |
| 9,575,570 | B2 | 2/2017 | Liberty et al. |
| 10,011,208 | B2 | 7/2018 | Eletrabi |
| 2006/0068948 | A1 | 3/2006 | Mendoza |
| 2006/0082171 | A1 * | 4/2006 | Olmstead ............. A63B 47/021 |
| | | | 294/19.2 |
| 2009/0137348 | A1 | 5/2009 | Tsai |
| 2010/0155156 | A1 | 6/2010 | Finkelstein |
| 2010/0250024 | A1 | 9/2010 | Ribeiro et al. |
| 2011/0303208 | A1 | 12/2011 | Taylor |
| 2014/0038751 | A1 * | 2/2014 | Yeager ............... G09B 19/0038 |
| | | | 473/431 |
| 2015/0061224 | A1 | 3/2015 | Ron et al. |
| 2015/0095026 | A1 | 4/2015 | Bisani et al. |
| 2017/0153091 | A1 | 6/2017 | Diaz |
| 2017/0189769 | A1 | 7/2017 | Chen |
| 2020/0086182 | A1 | 3/2020 | New et al. |

OTHER PUBLICATIONS

U.S. Appl. No. 16/676,218, filed Nov. 6, 2019, Legg et al., related copending application.
U.S. Appl. No. 16/866,480, filed May 4, 2019, Legg et al., related copending application.
"Ballbot: A Low-Cost Robot for Tennis Ball Retrieval", John Wang, Technical Report No. UCB/EECS-2012-157, http://www.eecs.berkeley.edu/Pubs/TechRpts/2012/EECS-2012-157.html, Jun. 2, 2012.
"Stanley: the robot that won the DARPA Grand Challenge," Thrun et al., Journal of Field Robotics 23(9), 661-692 (2006).
D. Comaniciu and P. Meer, "Mean shift analysis and applications", Computer Vision, 1999. The Proceedings of the Seventh IEEE International Conference on, vol. 2, 1999, pp. 1197-1203 vol. 2.
S. Suzuki et al., "Topological Structural Analysis of Digitized Binary Images by Border Following," Computer Vision, Graphics, and Image Processing, vol. 30, No. 1, Abstract (1985), http://www.sciencedirect.com/science/article/pii/0734189X85900167.
M. Pilu, A. Fitzgibbon, and R. Fisher, "Ellipse-specific direct least-square fitting," in Image Processing, 1996. Proceedings., International Conference on, vol. 3, Sep. 1996, pp. 599-602 vol. 3.
"Frequency Domain Multi-Channel Acoustic Modeling for Distant Speech Recognition", Wu Minhua, K. Kumatani, S. Sundaram, N. Ström, and B. Hoffmeister (IEEE International Conference on Acoustics, Speech and Signal Processing May 12-17, 2019).
"Multi-Geometry Spatial Acoustic Modeling for Distant Speech Recognition", K. Kumatani, W. Minhua, S. Sundaram, N. Ström, and B. Hoffmeister (IEEE International Conference on Acoustics, Speech and Signal Processing May 2019).
"Dynamical Models for Omni-directional Robots with 3 and 4 Wheels", Helder P. Oliveira, Armando J. Sousa, A. Paulo Moreira and Paulo J. Costa, International Conference on Informatics in Control, Automation and Robotics pp. 189-196 (ICINCO 2008).
"Fast and Precise Positioning of Wheeled Omni-directional Robot with Input Delay using Model-based Predictive Control", M. Zarghami et al., IEEE Proceedings of the 33rd Chinese Control Conference, Abstract ISBN: 978-9-8815-6387-3 (Jul. 28-30, 2014).
"Bear Claw: Tennis Ball Collector", http://courses.me.berkley.edu/ME102B/Past_Proj/f09/1%20BearClaw%20Tennis%20Bal%20Collector/index.php> Jun. 2016.

* cited by examiner

BALL RETRIEVAL SYSTEM AND METHOD

CROSS REFERENCE TO RELATED APPLICATIONS

The present application is a continuation-in-part application Ser. No. 16/866,480 filed on May 4, 2020, and entitled "Ball Retriever System and Method", which was a continuation-in-part ("CIP Bypass") application of PCT Application No. PCT/US19/60143, filed on 6 Nov. 2019 and claiming priority to U.S. Provisional Patent Application No. 62/756,450, filed on Nov. 6, 2018 and entitled "Tennis Ball Retriever System and Method", and to U.S. Provisional Patent Application No. 62/908,267, filed on Sep. 30, 2019 and entitled "Tennis Ball Retrieval System and Method", all of which are herein incorporated by reference.

FIELD OF THE INVENTION

The invention relates to a method and system for retrieving and returning a ball on a sports playing surface during play, and more particularly to a method and system for locating, retrieving, and returning a tennis ball to a programmed, manually-directed, or signaled target location on a tennis court during match play.

BACKGROUND OF THE INVENTION

FIG. 1 shows the layout and the dimensions of a tennis court, where each baseline is the line intersected by its "center mark" and behind which a player is positioned when serving. The dimensions are as follows:
Baseline: Doubles 36 feet (11 m)/Singles 27 feet (8.23 m) width
Center mark: 4 inches (10.16 cm) length
Service line: 27 feet (8.23 m) width (same as singles baseline)
Center service line on each side: 21 feet (6.4 m) in length (from net)
Baseline: 39 feet (11.89 m) in length (from net, same for both Doubles and Singles court size)
The serving player is therefore at least 39 feet (11.89 m) from the net.

A pickle ball court is also rectangular in shape, divided into two sides by a net, but is smaller than a tennis court. A platform tennis court is 4 feet longer compared to a pickleball court but just as wide. Platform tennis has a net that is two feet higher and allows players to come right up to the net. Pickleball has a shorter net and does not allow players to come right up to the net—this is called the no volley zone. The courts' surfaces resemble that of a tennis hard court, although the latter can vary since tennis is played not just on hard courts but also on clay/composites, grass, and differing indoor versus outdoor hard-court surfaces.

Play conditions can vary also according to the surface type and when outdoors with environmental conditions including wind and temperature. An element common to all these play conditions, however, is that the amount of time spent in actual play (versus "non-play", i.e. planned or forced pauses) is adversely impacted by players having to retrieve loose balls both while serving and after completing points, slowing the pace and thus affecting the quality and efficiency of play.

Professional tournaments address the issue by employing ball-persons for retrieving loose tennis balls to expedite play, a luxury not available for most due to the lack of fiscal or available manpower resources. Court time is typically expensive, and of course time is money. Players therefore often opt to play on despite the presence of loose balls on the court, which pose both a distraction and a safety hazard (a player may step on a ball and incur injury).

Although there have been solutions proposed or marketed to assist players in retrieving and picking up loose tennis balls, these are not designed for in-play. Most of these tennis ball collection/retrieval systems are just manual collection devices requiring walking to each ball and therefore do not promote increased play time.

U.S. Pat. No. 10,011,208, "Dual Function Robot and Storage Bin", H. Eletrabi, ("Eletrabi"), issued Jul. 3, 2018 and incorporated herein by reference, describes an automated robotic rollable object (tennis ball) collector system; its design is primarily directed to the collection of tennis balls on the court, but only "en masse" after a practice session or the like, which necessitates a cessation in play on the court without promoting continuing play as during a match. Eletrabi also discloses that its size and weight make power consumption a concern.

U.S. Patent Application Publication No. 2020/0086182, "Autonomous Tennis Ball Retrieval Robot", New et al., published Mar. 19, 2020 and incorporated herein by reference, describes an autonomous robot that collects tennis balls on a tennis court surface and transfers the balls into a launcher (or "shooter"). The robot is designed solely as a ball retriever/shooter for a practice session on one court side opposite that of the player and is not configured for match play conditions necessitating retrievals on both court sides and off-court and return to a player during the course of a match.

Another automated approach, "Ballbot: A Low-Cost Robot for Tennis Ball Retrieval", John Wang, Technical Report No. UCB/EECS-2012-157 (hereinafter "Wang"), http://www.eecs.berkeley.edu/Pubs/TechRpts/2012/EECS-2012-157.html, Jun. 2, 2012, describes a mobile robot platform; as with Eletrabi, all the system components are on-board, including processing, computer vision, and wireless communication. Wang's computer vision system employs on-board cameras with a framerate of 100 frames/s at a 320×240 resolution interfaced with a PandaBoard via USB. The motion planning and control program calculates retrieval paths and commands the robot steering along the mapped route, optimizing the route by length and other factors. The "Path Planner" uses a lattice based planning approach that encodes differential constraints into the route without the need for post processing, factoring in the net as a fixed obstacle while also accounting for other static obstacles such as benches and dynamic obstacles such as players. Wang notes that this adds to edge costs but also observes that a sparsity of obstacles allows for processing optimization and increased system response time and retrieval speed. The ball location/search algorithm is a heuristic based search model, using a version of Moving-Target (MT) search called Lazy MT-Adaptive A*, described in S. Koenig, M. Likhachev, and X. Sun, "Speeding Up Moving Target Search," Proceedings of the 6th International Joint Conference on Autonomous Agents and Multiagent Systems, ser. AAMAS '07. New York, N.Y., USA: ACM, 2007, pp. 188:1-188:8. [Online]. Available: http://doi.acm.org/10.1145/1329125.1329353. The algorithm works well for the situation where both the agent (robot) and the goal (ball) can move. MT-Adaptive A* incorporates two key concepts compared to A*, (i) Heuristic update after path computation, and (ii) Heuristic correction for Moving Target.

Wang uses a closed loop controller that enables it to use localization information to follow planned paths accurately. The controller has two components—speed control, whereby the controller commands speeds to the Arduino, which then runs PID control based on a wheel encoder to maintain the commanded speed and steering control; and, steering control base as described in "Stanley: the robot that won the DARPA Grand Challenge," Springer Tracts in Advanced Robotics, M. Buehler, K. Iagnemma, and S. Singh, Eds. Springer Berlin/Heidelberg, 2007, vol. 36, pp. 1-43, 10.1007/978-3-54073429-1 1. [Online]. Available: http://dx.doi.org/10.1007/978-3-540-73429-1 1. The steering controller is based on a nonlinear feedback function of the cross-track error x(t) which measures the lateral distance of the center of the robot's front wheels from the nearest point on the trajectory.

Like Eletrabi, the Wang robotic device is impractical for match play due to its large size, weight, processor overhead, and consequent power demand. As with other prior art approaches, it employs a ball pickup mechanism, adding to its weight, complexity, and power overhead that altogether limit its collection capability. The ball pickup mechanism includes two motors, with gearboxes, and draw 6 A, providing 130 oz-in of torque necessary to compress the tennis ball as it enters the pickup.

It is therefore desirable to provide a reliable and energy-efficient apparatus, system, and method for retrieving and returning a tennis ball to a player during play.

BRIEF SUMMARY OF THE INVENTION

According to the invention, a tennis ball retriever for retrieving a tennis ball on and about a tennis court and for controllably releasing the ball includes a front-end ball collector having two spaced-apart blades defining a ball collection space. The retriever includes a means for gripping and securing a ball positioned at the fore end, and one or more detents for retaining the collected ball in the collection space until a programmed or manually-directed release toward a target location such as a tennis baseline. The retriever includes a processor-controller for controlling and directing the retriever during a retrieval session. The retriever may be remote-controlled such as by voice commands.

Also, according to the invention, a remote-controlled retriever for collecting a ball on a sports playing surface and for controllably releasing the ball includes a front-end ball collector having two spaced-apart blades defining a ball collection space. Each blade includes a passive or an active detent for detaining the collected ball in the collection space until a programmed or manually-directed ground release utilizing the retriever forward movement toward a target location such as a tennis baseline The retriever optionally includes a means for ejecting the ball from the ball collection space to augment a ground release. The retriever includes a processor-controller for controlling and directing the retriever during a retrieval session. The retriever can be configured for a tennis court for tennis ball retrieval as well as for other court sports including paddle tennis, platform tennis, and pickleball.

In one embodiment, the passive detent is a concave portion on the sidewall of each blade to ensure retaining a collected ball until its planned release. A lower horizontally-extending ball guide cooperates with the opposing blade counterpart structure to guide the ball on release toward the target (and prevent the ball from reentering the detent area during the release). A ball proximity sensor signals the presence or absence of a ball in the collection space. Active detents be employed. A ball ejector can be added to expand the functionality of the retriever.

The retriever includes means for determining its location and is initially positioned in its standby location (e.g. in a docking station), preferably by a net post. Upon powerup/startup, an initialization routine establishes its standby location relative to a programmed-in court grid, with a processor programmed to return the retriever to standby following retrievals. The retriever can include an orientation sensor that upon powerup and initialization establishes a precise orientation relative to the court and the court grid. Processor programming can direct the retriever to commence parallel to and near the net on the directed court side, with the remote control redirecting the path (manually or in some designs via voice commands, either via the remote or without a remote directly to an acoustic pickup on the retriever or docking station). Additional proximity sensors on the retriever can sense and maintain a desired clearance from the net or other objects.

The docking station embodiment preferably includes means for attaching and securing to a net post and charging means for charging the retriever's power supply between retrievals. The docking station may also include means (e.g. a transponder or a transceiver) to communicate or ping its location to the retriever and guide it back directly after a retrieval.

In another embodiment, the invention includes a portable wheeled frame adapted to hold the retriever-in-docking-station with means for attaching the assembly to a net post. The frame can include a telescoping handle that when extended has space for holding a tennis gear bag. The retriever-docking station is rotatable from a portable carrying position to a standby position for use during play. The assembly can also include a lower, outer housing/bumper for absorbing the impact of a player running into it.

The ball retrieval system optionally includes a ball tracker/locator for determining the presence and location of a tennis ball on the court. Video sensors, e.g. one or more video cameras, provide a video data stream output to a processor that calculates the ball location to where the retriever is directed. The retriever can then be directed either to collect another ball or to travel to the ball release location. The ball tracker/locator may be positioned on or apart from the retriever, e.g. on a net post.

The invention in ground releases utilizes the forward motion of the retriever to release the ball toward a target. The target can be the center service line, or toward a player signaling via the player's remote control or similar device. The invention's ground release embodiments provide a fast and energy-efficient ball retrieval methodology.

The ball tracker/locator embodiment of the invention tracks and locates loose balls, and preferably includes a visual or audible indicator to signal when a ball is located for retrieval (e.g. a ready light indicator positioned on a net post). The system can indicate any tennis ball within its scanned retrieval areas, including balls rolling onto the court from nearby courts, promoting player safety. The operator/player's remote control signals the system to commence a retrieval, manually override a retrieval, or direct the retriever to areas outside the programmed scanned areas.

The retrieval system can include an app on a smart phone or equivalent device to establish/initialize the standby position for the retriever, e.g. by the GPS functionality, preferably aside a net post. The retriever preferably includes an orientation sensor that coordinates with a programmed-in court grid for establishing retrieval paths and returns. The docking station may serve as a charging station for the retriever, for example by employing a coil induction-type charger, to extend the retriever useful operating time.

The invention provides an entirely new approach in automating and expediting play on tennis as well as other courts. Balls are collected and returned fast and efficiently utilizing the retriever's motion for ground releases in the programmed direction, e.g. toward the center baseline where a tennis player can easily collect the ball on the racket face. The invention's ground release embodiments are more energy efficient than alternative options, e.g. ball-lifting collection devices. Many players favor a baseline singles strategy, therefore returning retrieved balls there greatly facilitates play. Older players can opt to play singles with the assistance of the invention rather than having to resort to the doubles game. Overall, the energy expended in automatically retrieving a low-mass tennis ball is multiple orders of magnitude less than that of a player retrieving the ball. The invention also promotes maximum play-time (increasing the play to non-play ratio) to provide better value for the court rental cost, and to reduce match time. The latter consideration is particularly significant for tournament and other match play not utilizing ball-persons, for example in college or other scholastic matches. These matches sometimes employ a chair umpire, who can assist in expediting play by controlling retrievals as part of his or her tasks. The invention can decrease the number of, or even eliminate, ball-persons, e.g. by obviating the necessity for stationing one or more ball-persons at the net posts. Another benefit is ball-person safety since ball-persons near the net are occasionally injured by ball strikes.

Yet another benefit is the minimization of human contact with and handling of the ball, which given the present SARS-Covi-2 ("Covid-19") pandemic and the transmissibility of viruses via contact with surfaces, presents player safety concerns. The Pro version especially lends itself to decreasing handling and cross-contamination between match participants and ball-persons conducting ball retrievals at pro tournaments.

DETAILED DESCRIPTION OF THE INVENTION

DEFINITION(S): "Blade" as used herein also includes structures resembling those described—e.g. opposing spaced-apart arms and the like—exhibiting the same functionality and capability of capturing and containing a tennis ball in a collection space therebetween. "Processor-controller" includes both (i) an integrated processor and controller, as well as a processor component having outputs connected to a controller component's inputs. "Detent" as used herein includes both i) "active" detent mechanisms that operate by the application of a force thereto, moving at least one component in order to retain and then release at least one tennis ball in/from a collection space, and ii) "passive" detent structural components that operationally are fixed structures accomplishing the same functionality. "Remote" or "Remote control" as used herein includes hand-held-type remote control devices, devices such as smartphones with dedicated apps or the like programmed with the functionalities described herein, and voice command devices, e.g. positioned on the retriever or docking station. "Operator" can include players and non-players, e.g. a chair umpire or a ball-person. The phrase "determining the location [of retriever]" includes but is not limited to establishing the retriever's location relative to a local court grid; accordingly, it also includes the use of other systems such as GPS-based. "Ball" primarily includes a tennis ball but may also include other [similarly sized] balls used in other racket sports, e.g. (i) a pickleball ($\approx$2.78-2.97" diameter, weight $\approx$0.78-0.935 oz) used in the game of pickleball and played on a court as described above; (ii) a platform tennis ball, typically either a Vittert-made lo-bounce (V-30) or hi-bounce ball, the latter preferred for certain matches or in the cold; and (iii) a paddle tennis ball which has a relatively lower bounce/pressure (the paddle ball has an internal pressure about half that of a tennis ball). A "fiducial marker" or "fiducial" is an object placed in the field of view of an imaging system which appears in the image produced, for use as a point of reference or a measure. It may be either something placed into or on the imaging subject, or a mark or set of marks in the reticle of an optical instrument. "Fiducial" accordingly includes a ball subject to identification/recognition/print by the robot camera/image processor during ball retrieval(s) as well as other instances noted hereinbelow.

Figure 1:
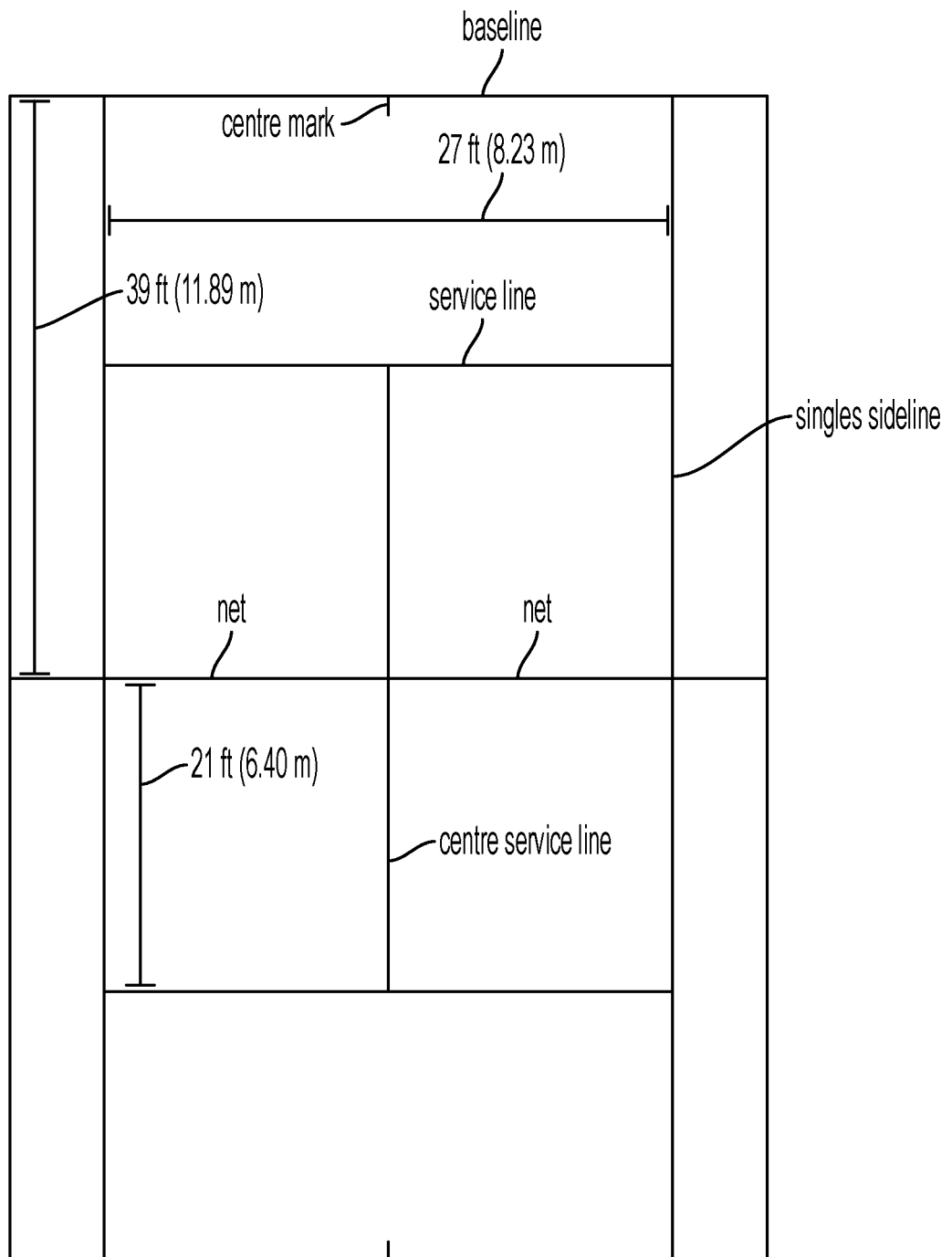
FIG. 1 is a schematic view showing a standard tennis court layout with dimensions.
Figure 2:
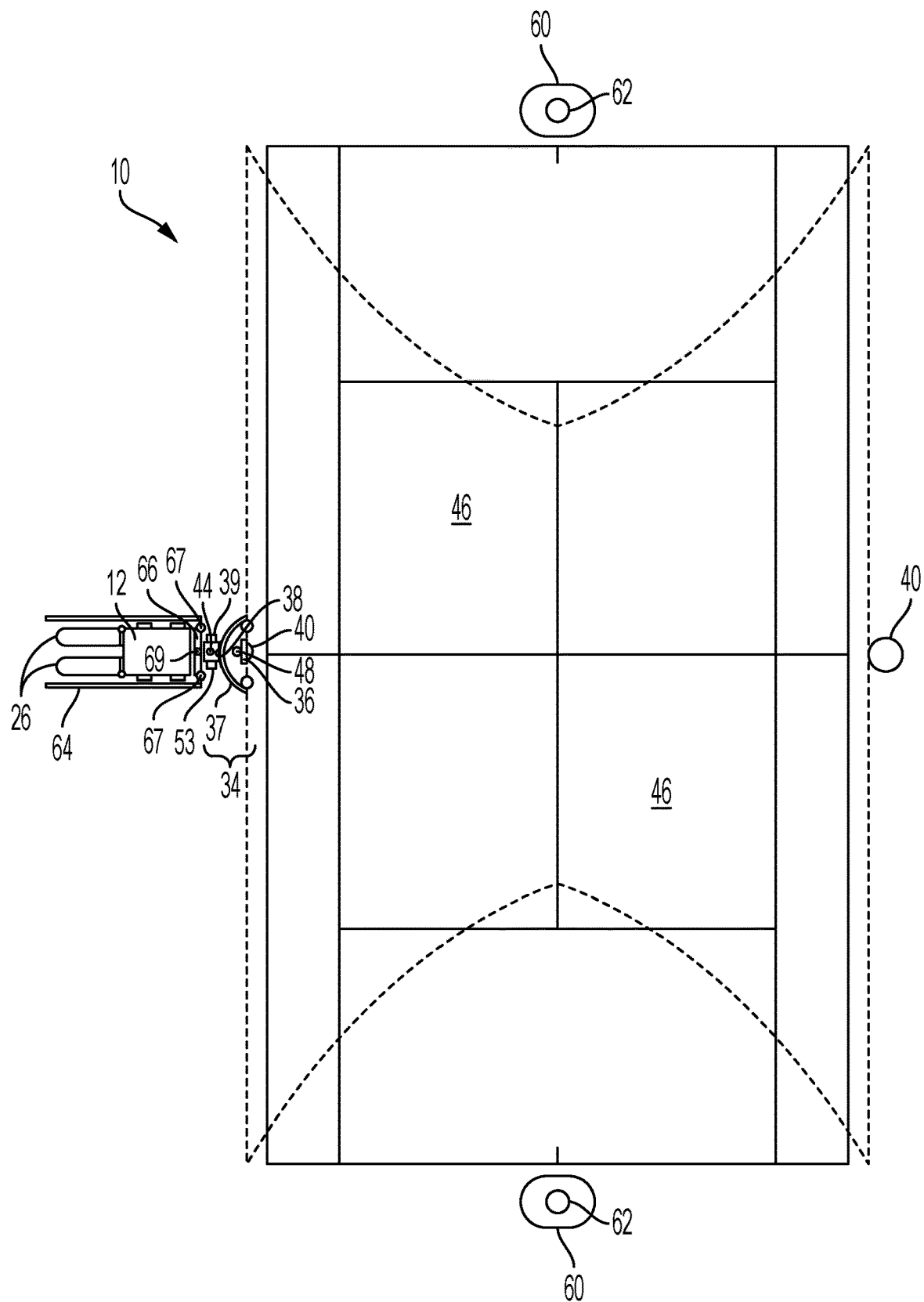
FIG. 2 is a perspective view of a ball retriever system positioned on a tennis court according to the invention.
Figure 3:
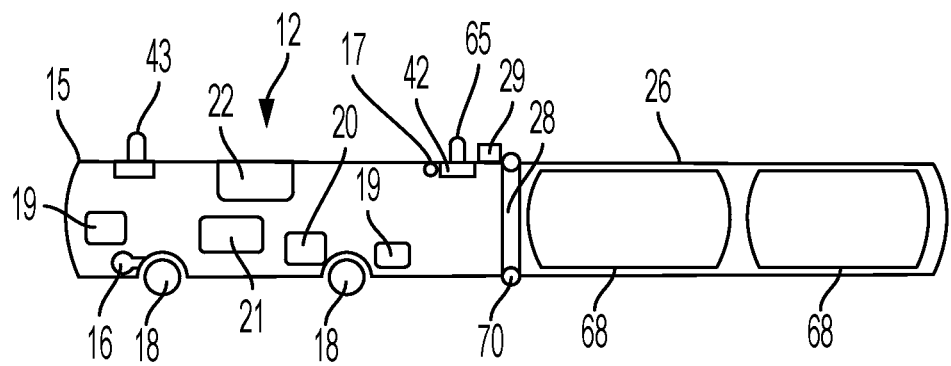
FIG. 3 is a side elevation view of a ball retriever according to the invention.
Figure 4:
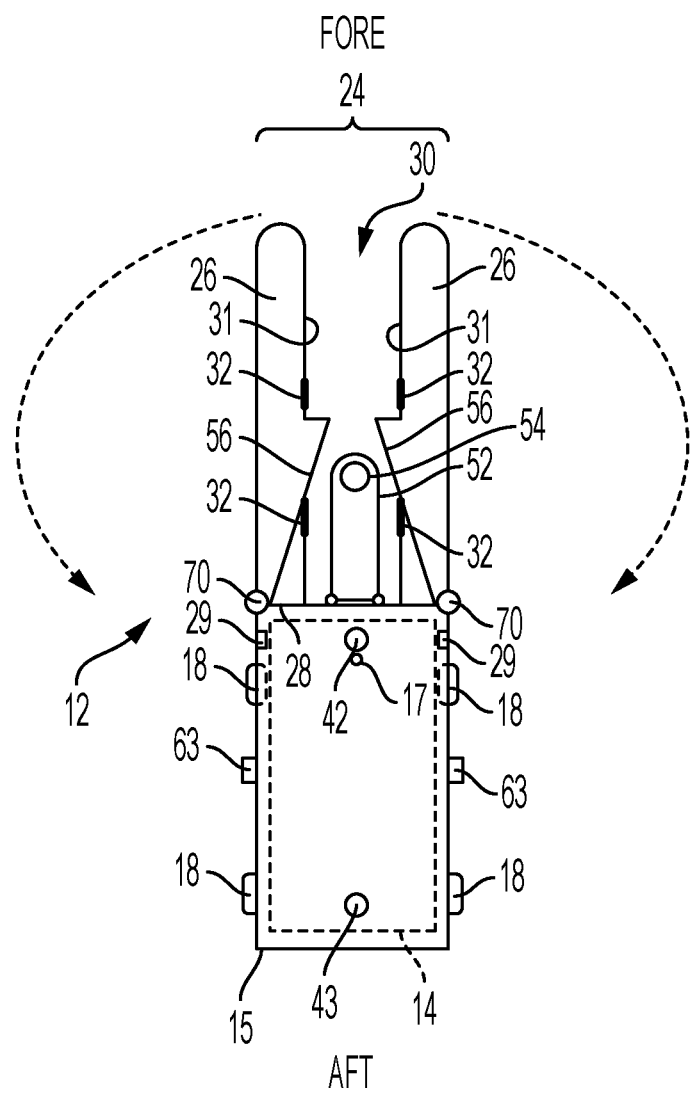
FIG. 4 is a top elevation view of a ball retriever according to the invention.

Referring now to FIGS. 2-4, a ball retrieval system 10 includes a retriever 12 having a chassis 14 and mounted thereon at least one drive motor 16 and a set of wheels 18, wherein at least one of the wheels 18 (and preferably two via a connecting axle, e.g. between the rear wheel set) is coupled to the drive motor 16 (the invention also includes each wheel 18 being associated with and coupled to its own drive motor 16 to provide all-wheel drive). Retriever 12 further includes a housing 15 on chassis 14, and mounted thereon a means 17 for determining the orientation of retriever 12 (e.g. a 3-axis MEMS magnetometer), a means 19 for determining retriever 12 location (e.g. an odometer—each wheel can include a wheel encoder with an output to a processor-controller 21 input, and/or GPS as discussed further below), a means 20 for steering the retriever 12 (optionally mounted onto chassis 14 depending on design, which are discussed extensively below), a processor 21 (e.g. the Pololu A-Star 328PB Micro programmable module with ATmega328PB AVR microcontroller) for receiving and processing input signals and with outputs for controlling retriever operation including steering and drive output signals, and an on-board power supply 22 for providing power to the processor, drive, steering, and other on-board components. It is noted that although processor-controller 21 is shown as being on retriever 12 with the available on-board local connections/inputs/outputs, it may optionally be located off-board with the input-output signals communicated via a wireless communications protocol; e.g. processor-controller 21 might be incorporated into a multifunction device such as a remote control (discussed below) or in another system processor (also discussed below).

Retriever 12 includes a ball-collector 24 comprising a pair of opposing blades 26 extending from a leading wall 28 of the housing 15 (or chassis 14), and which can be integral with the housing 15, e.g. a one-piece polymer injection mold part; LEDs 29 may also be positioned thereon and are further discussed below. Blades 26 together define a ball collection space 30 therebetween for receiving-collecting therein one or more tennis balls, and preferably one or more ball proximity sensors 32 positioned on at least one sidewall 31 of an opposing blade 26 adjacent to space 30 (or above space 30 as is further described below) for sensing the presence therein and subsequent release therefrom of the retrieved ball(s). Accordingly, multiple such sensors 32 may be spaced apart laterally along wall 31 as shown for sensing and indicating multiple balls collected and released. Sensor(s) 32 may comprise a basic photoresistor light sensor, an infrared (IR) transceiver, or other basic proximity sensors well known in the art. In a basic version sans blade sensor(s), manual control/direction directs retriever 12 after ball collection for the subsequent ball release. Blades 26 can be sized and configured depending on which of the embodiments herein is utilized, as well as for the number of balls to be handled at one time, as is further described below.

The dimensions of retriever 12's ball collector 24 are based on the official tennis ball dimensions established by the International Tennis Federation: diameter 6.54-6.86 cm (2.57-2.70 inches), and a mass of 56.0-59.4 g (1.98-2.10 ounces). Accordingly, ball collection space 30 preferably has a width of at least 2.70 inches extending along collection space 30. It is also noted that these dimensions can also apply to a pickleball or the like given its similar diameter, which of course can be adjusted (to, say, ≈2.8 up to 3.0 inches given the regulation pickleball range) as necessary. To minimize possible snagging on the net during retrievals (1¾" square mesh), blades 26 can be sized and shaped as discussed below to minimize snagging of in favor a sliding contact instead.

In one embodiment decreasing the amount of manual control required in initially directing retriever 12 toward a ball for retrieval, system 10 includes a ball tracker/locater 34 comprising one or more ball location/tracking video sensor(s) 36 and a processor 38 programmed with instructions for processing a digital video stream from sensor(s) 36 and determining a ball location relative to a standard court grid layout. Power supply 39 provides power to system 34 and processor 38. The ball tracker/locator 34 can be positioned at, adjacent to, or on a net post 40, or on the retriever 12 itself, and is capable of scanning and tracking at least the programmed retrieve areas on each court side. Although processor 38 may also be placed on-board retriever 12, and the power supplies for each potentially consolidated into one, separating these components as shown renders retriever 12 more efficient for its main function of retrieving by minimizing its size and weight. This extends its range and operating time and provides design flexibility for system 34 and its video-processing capabilities. In the embodiments where ball tracker/locater system 34 is positioned off-board retriever 12, ball tracker/locator system 34 communicates ball position/directional commands therebetween; accordingly, retriever 12 and ball tracker/locator system 34 each preferably includes a transceiver ("T/R") 43 and 44, respectively, for transmitting and receiving retrieval commands and other system communications, e.g. at initiation or completion of a ball retrieve step to input to processor 38. In basic embodiments, T/R 43 may instead include just the receiver for receiving directional and other control commands transmitted by remote 60, while remote 60 likewise may include just the transmitter. Sensor(s) 36 may comprise one or more digital video cameras positioned atop net-post 40 with a field of view covering programmed retrieval areas 46 (dotted lines) on both sides of the net; of course, areas 46 are expandable per user preference up to the sensor(s) 36 capabilities. Bullet or fish-eye cameras can expand these, but may increase the processing overhead, for discriminating from other objects and noise in ball location determinations. An exemplary hardened mounting configuration for sensor(s) 36 includes a protective cage 37 to protect sensor(s) 36 from ball or other impacts. The two-camera 36 net post setup with cage 37 shown in FIG. 2 provides good stereo vision ball location capabilities and accuracy.

Since the tennis court layout has mirror-image symmetry, processor 38 can employ the net as the primary boundary with respect to each ball location calculation in areas 46. Preferred automatic or manual retriever commands based on area of retriever coverage are optionally set by a player, e.g. based on individual preferences and match conditions, via a user interface such as a smartphone app. Accordingly, a player may opt for and set a customized collection range during play; e.g., a player may require additional assistance from retriever 12 as a match proceeds and the player tires.

As discussed further below, blades 26 are optimally configured to engage in retrievals at or near the net with minimal snagging. Processor 38's direction of travel computations/commands preferably direct retriever 12 on a retrieval path designed to avoid the possibility of fouling or snagging on the net or other obstructions. This is accomplished via computing a best angle of attack, i.e. the direction retriever 12 takes toward a ball, and processor 38 can include an abort or other routine such as alternate path computation upon an on-board proximity sensor 42 (in conjunction with sensors 36) sensing an obstruction between it and a ball. It should also be noted that if system 34 is positioned on-board as discussed above, it may alone suffice in lieu of sensor 42 for all ball tracking and obstruction sensing purposes, while a more basic version may dispense with sensor 42 (as well as system 34) altogether in favor of directing retriever 12 to a ball using just the remote. A good selection for proximity sensor 42 is an ultrasonic-type sensor that generates high frequency sound waves and works on a received echo principle to detect an object "interruption", here the ball. Since it doubles as a range sensor, processor 38 and/or processor-controller 21 can compare its range input with the original ball location calculation (or recalculation as discussed) to differentiate between a ball near another obstacle (e.g. the net or net post).

System 10 preferably includes at least one indicator 48, such as a light, for signaling the players that the system has located a ball for collection, as well as to indicate the location of multiple balls for collection. Loose balls ready for retrieval include balls rolling onto the court from players on other courts. Indicator 48 may comprise fiber optic light indicators or bulbs (incandescent, fluorescent, or halogen) should power, size and space design parameters permit for a given application. Peripherally positioned LEDs (not illustrated) can indicate other system 10 functions as desired, such as multiple balls located and system statuses. A player upon observing a "Ready" indication initiates a ball retrieve operation via a player remote 60 and its transmitter 62 (further discussed below), signaling ball tracker/locator system 34's T/R 44 to initiate the retrieve with processor commands directing retriever 12 toward the ball. Of course, ball tracker/locator system 34 may identify/locate more than one ball, and occasionally on both sides of the net. In the latter situation, system 10 preferably includes a directional-finding capability built in to the T/R protocols and hardware for ball tracker/locator system 34 to determine which side of the net to respond to given that decision tree preference, also depending on the actual ball location(s) determined and saved by processor 38 for a retrieval directional command.

The ball tracking/locating algorithm can further delineate whether a ball is likely to encroach into areas that pose a distraction and/or a safety hazard to a player and then trigger an alert by activating indicator 48 or to sound an alarm like a player remote vibrate mode alert. The invention preferably includes a mapping algorithm that can be set to a player's preference to include a desired retrieval area as well as to exclude court portions the player opts to self-retrieve, although these may include a player-override should a player opt out or opt in, respectively, to the auto-retrieval. E.g., a player's remote can be programmed/configured to permit the player to signal and override the retriever's current or programmed step. The retriever may further include means visible and/or audible to the player to indicate its ready status. The functions can be coordinated via programming, e.g. the player remote programmed upon a short button press to both transmit a "retrieve" order and activate a system function that visually or audibly indicates to the player the number of balls identified for collection. The programming can also include a player override to skip one or more of the signaled ball collections, e.g. by employing another player action such as a long remote button press to override a retrieve action and command the retriever to return to standby. A preferable multi-ball retrieve sequence programs the system to retrieve all identified balls on a side of the court in increments, by collecting/returning the ball(s) closest to the retriever base station, with preference given to those closest to the net, and after retrieving and returning up to its ball-containing capacity, e.g. 2 balls, to then continue to complete retrieval of the rest of the identified balls on that court side until completion or receipt of an override-return-to-base command.

System 10 may include a heuristic-type of learning algorithm that utilizes the information from each player-signaled retrieval to identify probable player-preferred retrieval situations, and provide the players the option to switch system 10 to an automatic mode not requiring a player retrieval signal (but optionally subject to override as discussed herein) whereby system 10 engages in retrievals automatically. In the automatic mode, system 10 can utilize either indicator 48 or an audible alert to indicate to the players that retriever 12 is commencing or about to commence a retrieval, with perhaps a design time delay to allow player override via a remote.

Retriever 12 upon collecting the ball is then directed to the calculated release point by processor 38 (although this can alternatively be conducted by processor-controller 21 or by the direct signaling linkup between player remote 60 and retriever 12). Except for those versions comprising an ejector or the like, the ball release is accomplished solely by the motion of retriever 12 toward the target (center service mark, player, etc.) and the matching forward velocity of the ball. Retriever 12's acceleration or inertia (along with the detent when provided or actuated) maintains the ball in collection space 30 until retriever 12's programmed deceleration releases (or ejects as discussed below) the ball at the release point from collection space 30, rolling the ball to the target to complete the ball return.

Upon release/ejection of a ball or balls from space 30 in the programmed (or user-override) direction, processor 38 (or processor-controller 21 in other configurations) is programmed to direct retriever 12 to return to the standby off-court position, preferably adjacent to one or the other net posts, to await the next retrieval command. Processor 38 preferably includes programming instructions that upon execution cycle/turn off indicator 48 once a ball is captured as sensed by sensor(s) 32.

Ball location/tracking video sensor(s) 36 and on-board proximity sensor 42 preferably cooperate during a ball retrieval where system 10 is programmed with instructions that upon execution "hand off" the ball location functionality from sensor(s) 36 to sensor 42 upon the latter acquiring a ball within a design or programmed distance, whereupon retriever 12 tracks the ball via sensor 42 up through ball capture as confirmed by sensor(s) 32. Sensor 42 upon retrieving/collecting then works in tandem with sensor(s) 32 where, after inputting a signal to system 10 confirming a ball collection, system 10 then transitions sensor 42 into an obstacle detector function; in other words, depending on the retriever 12's calculated route status, system 10's logic and programming instructions upon execution cause sensor 42 to cycle into an obstruction avoidance/remediation subroutine, or during the final programmed ball release step, optionally engage a ball release subroutine for a preemptive ball release prior to the default programmed/mapped release point upon sensor 42 sensing a player closer in than the default ball destination target such as the center baseline. Upon ball collection, system 10 preferably updates the actual ball collection location since the ball position may have changed due to wind or other factors, or even error in the original path computation that is addressed upon acquisition by and hand-off to sensor 42. This actual ball collection location is then factored into an updated retriever 12 path calculation, for purposes of updating the retriever 12 direction/release path from that position, as well as updating the retriever 12 return path to its standby position.

Prior to play in the initial setup of system 10, the programmed instructions can include a system calibration check/initialization whereby the players can confirm system 10's ball location accuracy, e.g. by positioning the retriever 12 in its standby location to lock it in, and by confirming the accuracy (and adjusting if necessary) of sensor(s) 36; one way is by placing a ball in one or more set locations to confirm system 10's accuracy vis-à-vis the programmed court grid coordinates.

System 10's ball location and path calculations may yet be limited in precision by the accuracy and sensitivity of locator 34/sensor(s) 36. Means 19 for determining retriever 12 location registers retriever 12's distance of travel and/or location coordinates (e.g. relative to a programmed-in court grid) during a retrieval, which information is input into real-time path computations to guide retriever 12 along the computed path to the computed ball location (except in the more basic, remote-only operated embodiment discussed herein). Upon handoff to sensor 42 and any path course variation from the calculated original, the revised course calculation updates the ball retrieval/retriever 12 location, which data is utilized for both the ball return calculation and when necessary the retriever 12 return path to the standby location. In order to eliminate or at least minimize additive path error effects, i.e. over multiple retrievals, the return of retriever 12 to the standby location after ball release may consist of an independent action controlled by direct communication with a docking station or a net-post-based R/T and/or system 10 is reinitialized after each retrieval or path circuit to eliminate path error accrual (all discussed below).

Retriever 12 in one embodiment can include a retrieval path routine that utilizes the court lines (singles, doubles, baselines, service lines) to guide its return-to-standby/docking position (and/or to employ fiducials as discussed herein). For example, retriever 12 after the ball release can move in reverse and upon reaching the doubles line closest to the net post standby location track along that line back to the net post to facilitate the accuracy of the return path. An optimized retrieval path may be calculated from the singles line detection/arrival and then back to the standby/docking station location (e.g. a curved path). Retriever 12 can therefore include a line tracker (e.g. mounted on the aft end) programmed with instructions to process the line tracker data input and upon execution control the steering to direct the retriever along the optimal calculated path, e.g. toward the doubles line and then to the standby/docking station location. An exemplary line tracker is the TCRT5000 IR sensor including a TX and RX inside. If a bright color surface is detected in front of the sensor, such as a white paper (about 1 cm away), most of the IR rays will be reflected; if a dark color like black surface is detected, most of the rays will be absorbed, while only a small amount will be reflected. The RX will output different analog signals according to the intensity of the reflected IR light.

Programming and computational efficiency can be optimized by utilizing the retriever orientation determining means 17 (e.g. a magnetometer) in conjunction with both the distance-location computation-determination and the line tracker; e.g. upon ball release, retriever 12 can realign parallel to (or at a designated angle) to the initial standby position-magnetometer axes-vectors and then proceeding (preferably in reverse as discussed) toward the sidelines closest to and extending approximately from the standby net post-docking station, and the line tracker sense the line(s) with retriever 12 programmed to turn (@90 degrees or the necessary amount) and then utilize the doubles sideline to return toward standby. A proximity sensor (sensing the distance for the retriever 12 in approaching to and resuming the desired standby position) in conjunction with the other docking means discussed re-establish the desired standby position. Of course, there may be occurrences of mis-retrievals during the operation of system 10, e.g. due to retriever 12 encountering an obstacle, snagging, failing to collect a ball in a directed location due to various factors including system malfunctions, or intervening factors such as wind. System 10 therefore includes means for correcting a mis-retrieval, e.g. programming instructions that upon execution stop retriever 12 and redirect retriever 12 on a course to alleviate the issue, e.g. to then reverse (or attempt to reverse) direction when there's a failed handoff to sensor(s) 32 or some other issue, after which a further instruction and command retriever command may be to resume the current retrieval but within a set time interval, otherwise, stopping to await further command e.g. a player-initiated override, or returning to the standby location (e.g. outside a net post). One such routine applicable to a retrieval alongside the net would instruct retriever 12 to stop, back up a specified distance toward or along the original line of approach, and then correct the programmed path a specified degree or vector to attempt to clear the snag. The programming instructions can include an automatic abort routine that may be subject to player manual override (such as a "kill" button, an input sequence mated to the main player remote control switch/button, or voice command (e.g. "Stop")). The "retrieve fail" override preferably alerts a player visually, audibly, tactile (e.g. a haptic vibration mode or the like incorporated in the player remote), or via a player-selected preference. Override protocols may further include a "release fail" protocol upon sensor(s) 32 indicating that a ball or balls appear to be stuck in and fail to timely release from space 30.

Figure 5:
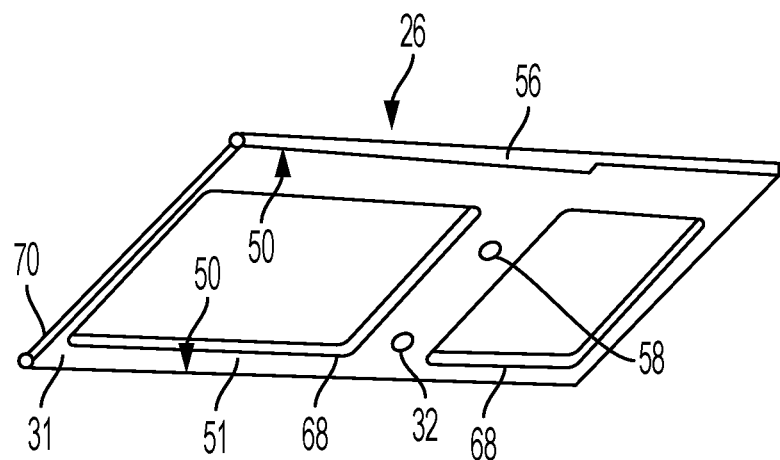
FIG. 5 is a side elevation view of a ball collection blade according to the invention.

Retriever 12 includes detents 50 (e.g. on walls 31) for retaining and releasing a ball to ensure a ball is not lost from space 30 prior to its programmed release, e.g. when retriever 12 undergoes changes in its forward motion velocity component during turns or deceleration. Detents 50 can be passive structures, active components, or a combination of both, and dampen (passive) or restrict (active) the ball's forward motion component in order to retain the ball in space 30 until the retriever 12 forward motion component again equals or exceeds that of the ball. Exemplary passive detent 50 is illustrated in FIG. 5 (and FIGS. 9-10, described further below). Blade 26 (the opposing blade 26 being its mirror-image structurally, although there may be minor variations in some embodiments, e.g. slots for sensors, fasteners, or the like) includes a concave (with respect to space 30) area 51 on sidewall 31 for urging a ball into (or back into) space 30 during collections, retriever turns and the like to retain the ball up to the programmed (or player/operator-initiated) release. Passive detent 50 may further include an upper lip 56 and/or a stop 58 (e.g. a ridge or bumper) to help retain and urge the ball back into collection space 30 but also configured to not interfere with the ball release. For example, proper clearance must be provided between opposing stops 58—their placement height vis-a-vis the ball circumference can thus be determinative. Stops 58 may be contoured (e.g. concave toward the aft end) to deflect the ball back into space 30.

System 10 (or retriever 12's processor-controller 21 in the on-board embodiments) with or without a passive detent 50 configuration may be duly programmed to hold or attain a desired retriever 12 forward velocity component during retrieval for best results, e.g. via programming instructions that upon execution coordinate the inputs from sensor 42 and sensor(s) 32 to identify a ball exiting space 30 prematurely and respond by adjusting retriever 12's velocity and direction (and also utilizing sensor 42 if present to track the ball for re-retrieval).

Figure 6:
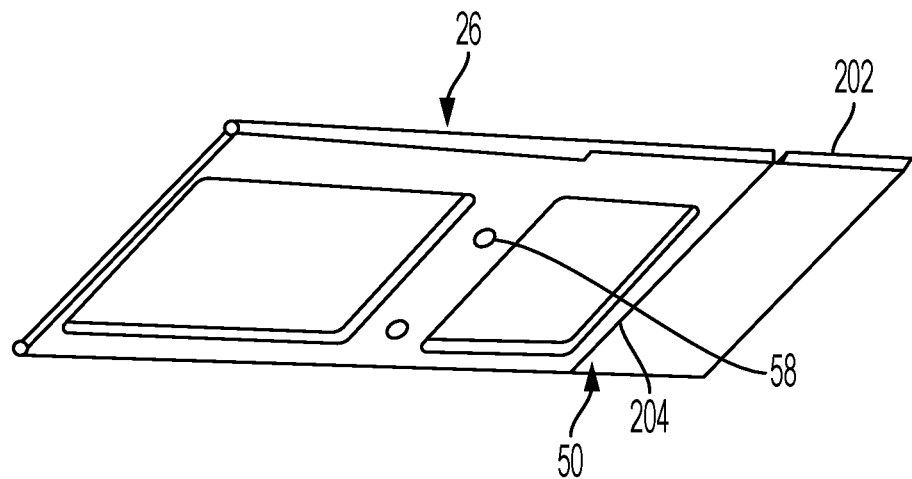
FIG. 6 is a side elevation view of a blade according to the invention.

FIG. 6 illustrates active detents 50, consisting of a retractable detent positioned on at least one sidewall 31 of each blade 26. Exemplary active detents 50 include solenoid-actuated pistons or buttons or a hinged blade 202 (e.g. a flipper) on (one or both of) a leading end 204 of blade(s) 26 responsive to ball retention/release system commands and the like. Unlike the passive detent discussed above, the active detents are sized to interfere with a ball release, i.e. these extend into and retract out of the ball release path. Although this adds to the design complexity of retriever 12, it simplifies programming by eliminating the problem of retaining the ball in space 30 otherwise addressed by system programming and input based on the sensors as described above. It also simplifies system programming by providing more flexibility in programming retriever 12's locomotion since it provides more latitude in retriever path computations and decreases path re-computations.

The retriever may further include ejector 52 mounted axially (e.g. toward the aft end of space 30 and along the retriever body centerline ("C/L") as illustrated in FIG. 4) for ejecting a ball or balls at release. Exemplary ejector 52s include (i) the solenoidal type, with the piston striker mounted orthogonally to impart a vertical motion to the ball, and (ii) a flipper, e.g. a lever arm-spring-operated device, to name but a few, triggered by a release command from processor 38 to eject a ball in the desired or program-computed direction at either a suitable, a designated, or a processor-computed velocity. Unlike a tennis ball, a pickleball, platform tennis ball, and paddleball and the like are not amenable to being readily scooped (or bounced) up from the playing surface given their reduced-bounce propensity and the shorter paddle versus racket. Paddle tennis is often played in the cold, and with a ball that even using a high-bounce version (e.g. the V-30) requires a respectable warm-up to bounce sufficiently.

Retriever 12 with an ejector 52 is therefore particularly advantageous for paddle-type court games, especially given the effort for the players to constantly bend over to pick up balls. Ejector 52 in these non-tennis sports presents less risk of harm to a player if struck upon ejection given the types of balls; for example, a pickleball weighs under 1 oz ($\approx$0.9 oz or 25 g) and a tennis ball more than double that ($\approx$2 oz or 58 g). In the (ii) flipper version, the lever arm assembly is a pivotally-mounted "flipper"-style mechanism as shown, whereby with retriever 12 preferably positioned aft end toward the target where with the flipper mounted as shown, ejector 52 ejects the ball in the target direction. Paddle and platform tennis balls can also be safely ejected in this manner. Retriever 12 may include a user setting to select either (i) eject-only or (ii) both ground and eject release. Of course, it may be desirable for safety reasons to configure on-board indicator 65 (described below) to signal a player when (ii) is opted to eject-release, visibly or audibly.

Absent ejector 52, retriever 12's velocity at the time of ball release alone dictates the ball release exit velocity; in this design, processor 38 can include programming instructions that upon execution computes a preferred ball release exit velocity based on the ball release location, preferably subject to user adjustment. For example, a ball located closer to the baseline or return target may dictate a slower release speed and a closer release point (with respect to the baseline/return target) than a ball located more distant. Court surface type may also dictate these parameters.

Ejector 52 may optionally be capable of imparting a vertical (y-axis) directional component (as well as a horizontal (x-axis) directional component, although in other embodiments the forward motion of retriever 12 may alone suffice for this purpose). E.g. ejector 52 may comprise a spring-tension-biased lever arm (a "ball-flipper") configured to accept a rolling ball over its leading edge onto a concavity sufficient to releasably hold the ball, with ejector 52 responsive to a ball release command to eject and propel the ball to a height, e.g. 2-4 ft., sufficient to enable a player to catch the ball or collect it on the racket face or on the bounce with minimal exertion. This option provides a low-power mechanism as compared to alternative ball capture-release devices for achieving the same result, and it may also utilize retriever 12's momentum to impart a desired x-axis component and eject the ball in the programmed direction.

Ball ejectors 52 include as stated previously a solenoid, or "firing ram"-style ball launcher such as the electrically powered launcher remotely controlled to actuate linear movement of a striking arm ejecting the ball as is described in U.S. Pat. No. 6,571,743 issued Jun. 3, 2003 (W. Curry); a fly wheel launcher such as that described in U.S. Pat. No. 7,691,012, issued Apr. 6, 2010 and U.S. Pat. No. 8,287,404, Oct. 16, 2012 (Cucjen et al.); and a hammer-style that relies on rotational movement of a striking arm rather than linear motion, as described in U.S. Pat. No. 6,176,230, issued Jan. 23, 2001 (R. Thompson), and in U.S. Pat. No. 9,339,716, issued May 17, 2016 (E. Ward) which also describes automatic actuation triggered by a ball sensor, a feed funnel, an ejection chute, and adjustability capability for both distance and ball launch angle; all of which patents are incorporated herein by reference. Embodiments of the invention incorporating some or all of these functionalities are included in the scope of the invention as is further discussed herein, although given the specific nature of the present invention versus the divergent applications of the cited references, it is desirable as discussed herein to employ a design in the invention that optimizes energy efficiency and minimizes weight.

Processor 38 (e.g. the Pololu A-Star 328PB Micro programmable module with ATmega328PB AVR microcontroller) is programmed with instructions that upon execution calculate a loose ball location and movement based on the video stream data relative to the standard court dimensions and the retriever 12 position and that guide retriever 12 for an optimal intercept, which computations can change depending on changes in ball position, direction and velocity. The angle of intercept of retriever 12 (and thus the retriever 12 computed path) is preferably optimized for subsequent release in a programmed direction (as well as for additional ball collection in the multi-ball collection scenario). The programmed ball return direction is preferably toward the center service mark on the same court side, that is, the center of the baseline. The return direction could alternatively be set in the direction of a signaling player via a "homing" signal means incorporated into the remote control. Homing signal means may include a directional RF locator, a pair of receivers or transceivers located on opposite sides of retriever housing 15 that are selectively responsive to a signaling device, or a unique remote device identifier with a device tracker to ascertain on which side of the court the remote is located. In addition, voice commands discussed herein can provide elements of this functionality.

System 10 is preferably configured to optimize ball retrieval efficiency while minimizing the processor 38 overhead. Accordingly, in the preferred embodiment the video-scanned and image-processed area is primarily directed to the on-court areas 46 affording the optimal time and effort savings to the players, starting from the net and proceeding back toward the service lines. As discussed, the player remotes preferably include an override function that enables a player to direct the retriever to positions outside the programmed areas 46 to manually direct the retriever in those instances. The remote can include sensors, e.g. gyro, accelerometer, magnetometer, etc. that sense the 3-axis orientation of the remote, which can be accessed by system 10 and retriever 12 to interpret the corresponding motion of the remote in directing the retriever 12 toward an off-court ball as a sort of "tractor beam" and even impart a Wiimote functionality to facilitate directing the retriever, further discussed below.

The use of more than one remote in directing a given retrieval can improve the accuracy of a retrieval path, whereby signals from two or more retrievers located on different parts of the court indicating the location of a ball can triangulate or otherwise improve the determination of more precise coordinates to which the retriever is directed. For example, in a professional tournament, more than one ball-person/ball-kid may each hold a ball retrieval direction-indicating remote to optimize the retrieval performance of one or more retrievers, including a retriever array as discussed herein.

Upon a player via remote 60 directing retriever 12 on a manual path for an out-of-area 46 retrieval, system 10 in this embodiment hands off to sensor 42 for the ball location input for retrieval and then upon sensor 42 sensing and signaling the ball, system 10 assumes control from remote 60, calculating a revised retriever 12 return path to the ball return location and directing retriever 12 there.

As discussed above, processor 38 is preferably optimized with respect to its overhead (and consequently its cost and power requirements) to determine the location of a ball efficiently while minimizing computation time. Sensors 32, 36, and 42 are selected for accuracy and sensitivity to coordinate effectively for ball collections and releases.

A tracking/location technique useful in the present invention is described in Wang, preferably with modifications. Wang describes a tennis ball tracking system capable of detecting a ball up to 5-6 meters from its robotic-based platform (i.e. "on-board" as the term is used herein), a range that can be expanded utilizing a better sensor-processor combination. Wang employs a PandaBoard as its main processor, functioning to conduct "compute-intensive tasks and external communications" via a dual-core 1 GHz ARM Cortex-A9 processor ("roughly equivalent to a netbook in terms of computing power"), and which includes an onboard WIFI module, Ethernet, and 2 USB ports. The Arduino ATmega2560-based development board, used for low-level motor and sensor interfacing, is clocked at 16 MHz with 8 kB SRAM, 4 hardware UARTs, a 2-wire interface for I2C, and 16 ADC channels. The board communicates with the Pandaboard via a hardware serial port on the OMAP processor. Wang states that the hardware serial is important because USB-serial incurs a non-deterministic latency from the USB-serial driver stack in a non-real-time operating system, which may result in random localization errors and destabilize the control loop. Wang employs stereo vision, with two PlayStation Eye cameras mounted in a parallel stereo configuration and interfaced with the PandaBoard via USB. The cameras provide a framerate of 100 frames/s at a 320×240 resolution and include an inexpensive and relatively low-latency Linux driver.

The Arduino Mega board is easily reprogrammed via USB and provides flexibility in interfacing different attachments or sensors. One sensor suite features a quadrature optical encoder rim and a 9 DOF IMU. 1) Wheel Encoder: The optical encoder is used both for velocity control and for odometry. It uses an Omron EE-SX1031 slot-type dual photointerruptor and an appropriately-sized codewheel to provide a resolution of 204 counts/m. 2) IMU: The IMU module used is the commercially available SparkFun 9 DOF IMU. It provides stable, filtered yaw rate measurements for odometry. The IMU is mounted on the centerline of the car for accurate yaw measurements. It is not drift-free, but it has proven reliable enough for incremental measurements of odometry. The Arduino Mega is programmed with software necessary to interface with the motors, servos and sensors. It runs a message-processing loop to receive commands (velocity, steering angle, ball pickup state) from the PandaBoard. The Arduino Mega runs a few time-critical tasks. Foremost of these, it runs a PID control loop to set the speed of the robot. This is done on board the low-level microcontroller because the control loop requires precise timing stability. It also sends odometry readings back to the PandaBoard at regular intervals. This ensures that the readings are spaced evenly so that the time delta between readings is consistent.

The invention in most embodiments avoids certain complexities necessitated by on-board court navigation approaches such as Wang by positioning video capture sensor(s) 36 off-board, adjacent to the court and as discussed above preferably on the net post covering the pre-calibrated collection areas and/or those set by the user. At startup, system 10 may be initialized (or "zeroed") by placing a ball at a predetermined location, e.g. at the junction of the center service box lines (the "T's") on each side, with a system 10 startup subroutine carrying out initialization based on relating the video data from each position to "lock in" and establish those coordinates the programmed-in standard court grid position and dimensions, optionally with GPS coordinates if system 10 is so equipped. Retriever 12 is concurrently positioned outside a net post and its starting ("standby", waiting-to-retrieve position) may be similarly initialized at system startup. As opposed to Wang and similar on-board approaches that direct processor overhead to determining line placement, e.g. via particle filtering, for device navigation, these embodiments of the invention avoid this complexity. Furthermore, the invention by positioning the sensor 36 separately from retriever 12 avoids other complexities of prior art on-board path motion and control systems, e.g. the false positives and errors introduced by camera sensor vibration.

As noted, system 10 when GPS equipped can apply it to both initialization protocols at startup to establish/initialize the standby position for retriever 12 as well as the court grid relative to its GPS coordinates and orientation since different tennis courts have different compass orientations. Retriever 12 can include on-board GPS in its T/R to facilitate location determinations and path computations. Remote control device 60 may also be GPS-equipped; it may also utilize a smart phone with invention protocols programmed into a dedicated app in IOS and/or Android with a compatible GUI, encompassing the control and operating functionalities described herein. For example, an initialization procedure may have a player initialize retriever 12's standby location, then take position at the center service-mark line and tag that location to the system court grid map and GPS coordinates, to thus establish the overall GPSed court map dimensions which are also linked with the retriever 12 position. If necessary, repeating this step on the opposite side of the court completes the specific mapping initialization sequence, although retriever 12's orientation relative to either post should alone suffice without this additional step. Of course, there are equivalent ways to establish the specific map, this is to describe just one such methodology. Also, the on-board sensors, including GPS and/or orientation means 17 can establish and direct precise positioning of retriever 12. Design choices can be based on the following considerations.

Navigation/Positioning Sensors

Positioning sensors are used to approximate the position of a robot, some for indoor positioning and others for outdoor positioning. The most used positioning sensor is a GPS (Global Positioning System). Orbiting GPS satellites transmit the signals and the retriever GPS sensor/receiver acquires and processes these signals. The processed information can be used to determine the approximate position and velocity of a robot, but these can function better outdoors and can be pricey. A digital magnetic compass provides directional measurements using the earth's magnetic field for direction determinations. These sensors are cheap compared to GPS modules, but a compass works best along with a GPS module if you require both positional feedback and navigation. Philips KMZ51 is sensitive enough to detect earth's magnetic field. Localization refers to the task of automatically determining the location of a robot in complex environment. Localization is based on external elements called landmarks which in the present invention can be part of the initialization procedure as discussed using ball placement in specified locations.

Sensor(s) 36 may be positioned at either net post 50 given the mirror-image symmetry relative to the court grid of either placement. This is especially advantageous since outdoor courts are usually oriented N-S so that the sun is not directly in a player's eyes when the sun is low in the sky. It follows that the selection of net post placement may be according to the sun's position, in that it is generally preferred for optimal object tracking/resolution/image processing that the sun is behind the sensor(s) 36.

Many indoor court facilities provide courts compartmentalized from one another via heavy vinyl, fabric or composite, curtains behind each baseline and side curtains that are often mesh curtains slidably suspended from overhead cables for ease of opening and closing to access/close off the court as needed. Retriever system 10 preferably includes a user-selectable setting for selecting a programmed-in indoor court layout included in the processor programmed instructions including the parameters associated with the indoor layout/dimensions, while retriever 12 as discussed above preferably includes one or more proximity sensor 42 (mounted where most effective) capable of sensing side obstructions or clearances to minimize interference, e.g. from indoor court side curtains, by signaling processor-controller 21 to direct or redirect retriever 12 as needed. A dedicated smart phone app/GUI that includes assigning a private comm protocol to just those players/that court minimizes interference between courts and the use of multiple retrievers in the vicinity by different courts and players.

Processor 38 (that is used in most embodiments) is programmed to process the video data and determine a probable ball location. In one embodiment, the invention incorporates the approach described in Wang for locating stationary balls on the surface of a tennis court. To cut out impossible regions where stationary balls could be found and reduce the search domain, only the region below a finite horizon extending over the court length is considered. Although the described approach addresses at most one ball being present in the frame, given the employment of an on-board sensor described further below, the invention can collect more than one ball captured in a frame. Textures and noise are smoothed by running mean shift like clustering over space, e.g. as described in D. Comaniciu and P. Meer, "Mean shift analysis and applications," in Computer Vision, 1999. The Proceedings of the Seventh IEEE International Conference on, vol. 2, 1999, pp. 1197-1203 vol. 2. The resulting posterized image has larger areas with nearly constant colors. Connected components or blobs, which are contiguous regions of nearly constant color are generated from the posterized image using a flood fill algorithm. Connected components which have pixel area much greater than what is possible for an image of a taken ball from the camera's height are discarded.

Contours bounding the connected components are found, e.g. as described in S. Suzuki et al., "Topological Structural Analysis of Digitized Binary Images by Border Following," Computer Vision, Graphics, and Image Processing, vol. 30, no. 1, pp. 32-46, 1985, http://www.sciencedirect.com/science/article/pii/0734189X85900167. Contours help in obtaining useful geometric properties like area, shape and position of the blobs. Contours are filtered on size and shape. This filtering based shape is done by first fitting ellipses to the blobs using a least squares technique, e.g. as described in M. Pilu, A. Fitzgibbon, and R. Fisher, "Ellipse-specific direct least-square fitting," in Image Processing, 1996. Proceedings., International Conference on, vol. 3, September 1996, pp. 599-602 vol. 3., and then evaluating the following two measures, $$\rho := M/m,$$

where M=length of major ellipse axis, m=length of minor ellipse axis, and $$\Delta := 1 - \text{Area(Blob)}/\text{Area(Ellipse)},$$

and where for a circular blob, $\rho \rightarrow 1^+$ and $\Delta \rightarrow 0^+$. The remaining contours' pixels are then converted to HSV color space for color-based filtering aided by the tennis ball's distinct optical yellow color. In the rare case that multiple blobs remain, the one with the largest area is assumed to represent the ball. Successive averaging and filtering leads to a progressively diminishing set of ball candidates which aids in reducing the computation overhead, a significant consideration in the system 10 design as noted and can detect balls at least up to 5-6 meters distance from sensor(s) 36. Wang states its dual-core 1 GHz ARM Cortex-A9 processor as roughly equivalent to a netbook in terms of computing power, whereas current equivalent processors are more compact, less expensive, and more powerful; furthermore, Wang positions the processors on-board, whereas in the preferred embodiment of the invention it is position Single object tracking, in which a target is often initialized manually in the first frame and then is tracked and located automatically in the subsequent frames, is a hot topic in computer vision. The traditional tracking-by-detection framework, which often formulates tracking as a binary classification problem, has been widely applied and achieved great success in single object tracking. However, there are some potential issues in this formulation. For instance, the boundary between the positive and negative training samples is fuzzy, and the objectives of tracking and classification are inconsistent.

It should also be understood that there are several alternative computer vision-based tracking approaches also within the scope of the present invention. For example, single object tracking, in which a target is often initialized manually in the first frame and then is tracked and located automatically in the subsequent frames, simplifies system 10 in the sense that one ball at a time can be tracked and its position determined without having to track another ball either simultaneously or while the tracking focuses on a first ball being tracked. This is because the tennis match play is briefly suspended in-between shots/serves. Each ball location is stored in processor 38 memory (and/or processor-controller 21 memory in some embodiments discussed herein) and accessed for retrieval, either one-at-a-time or in a multiple ball batch-style retrieval cycle/retriever 12 operation. Of course, other factors including environmental, e.g. wind moving the ball in the outdoor setting, may intervene; system 10 can therefore include an optional anemometer 53, preferably integrated with the ball locator 34 and processor 38 modules and comprising a MEMs-type device, e.g. the Modern Device model MD0550 wind sensor Rev. C, to sample real-time wind velocity and direction to input into the retriever 12 directional command structure a correction factor for directional calculations and commands for retrievals.

Locator system 34-processor 38 employ ball tracking technology as noted. Traditional single-object tracking-by-detection framework, which often formulates tracking as a binary classification problem, has been widely applied and achieved great success in single object tracking. Some issues with this exist. For instance, the boundary between positive and negative training samples may be fuzzy, also, the objectives of tracking and classification may be inconsistent in some applications. There are, however, approaches that address these aspects.

In one approach, tracking is addressed as a fuzzy classification problem and measures the importance of training samples by assigning different memberships to and provides stricter spatial constraints. It also applies a fuzzy least squares support vector machine (FLS-SVM) logic to implement a concrete tracker. It analyzes the primal form, dual form, and kernel form of FLS-SVM and derives the corresponding closed-form solutions for efficient realizations. Then, a least squares regression model is built to control the update adaptively, retaining the robustness of the appearance model. The reduction in the requisite processing overhead extends system 10's operating time and retriever 12's range between recharges.

MathWorks's Computer Vision System Toolbox™ also provides video tracking algorithms, such as continuously adaptive mean shift ("CAMShift") and Kaneda-Lucas-Tomasi (KLT). These algorithms are useful for tracking a single object or as building blocks in a more complex tracking system. The toolbox also provides a framework for multiple object tracking that includes Kalman filtering and the Hungarian algorithm for assigning object detections to tracks. For example, pixels detected using "vision.ForegroundDetector" separate moving objects such as a ball from the background. The background subtraction, however, may only locate part of a ball because of the low contrast between the ball and the court. Also, two other issues include the region's center is usually different from the ball's center, that is, there is an error in the measurement of the ball's location; and, the location of the ball is not available when it is occluded by another object, e.g. a portion of the net. These issues are addressed using the Kalman filter, to eliminate noise present in the tracking system and applying its use predict method by itself to estimate the ball's location when it is occluded by another object. When the ball is detected, the Kalman filter first predicts its state at the current video frame, and then uses the newly detected object location to correct its state. This produces a filtered location. When the ball is missing, the Kalman filter solely relies on its previous state to predict the ball's current location. The Kalman filter is configured with a set of suitable configuration parameters, e.g. using the "trackSingleObject" function and other options in the "configureKalmanFilter" function which returns a Kalman filter object based on provide five input arguments. The MotionModel setting corresponds to the physical characteristics of the object's motion and is set to either a constant velocity or a constant acceleration (/deceleration) model. The invention preferably sets to the latter, given that the ball is subject to constant deceleration due to rolling resistance/friction (unless as noted some environmental factor is present such as wind pushing the ball when outdoors). Of course, typically objects do not move with either constant acceleration or constant velocity. Kalman filtering therefore includes a MotionNoise subroutine to allow specifying the amount of deviation from the programmed motion; increasing the motion noise parameter commands the Kalman filter to continue processing additional incoming video object location and velocity tracking data to refine the ball location determination. This subroutine can further be paired with data from anemometer 53 to refine a ball location determination, or absent that, adjusted by a GUI or other such system 10 user setting option.

The Kalman filter advantageously also includes a routine/protocol to address multiple object tracking. Applying "vision.KalmanFilter" object together with "assignDetectionsToTracks" function addresses assigning detections to tracks, determining whether a detection corresponds to a new object, and in the case of an occluded single object can separate objects in close mutual proximity.

System 10 therefore can start processing the video data relevant to a given ball retrieval commencing with resolving a first target object frame, typically when a ball has slowed to a resolvable object speed. This fits perfectly within the parameters of the tennis game, since a player would not instantly recognize a desired pause-for-retrieval situation either until assessing the ball's direction and speed, and then estimating or "guesstimating" its probable path/destination. By then, system 10 will have detected and "locked in" the ball, along with its speed and its path, with processor 38 calculating the optimal retrieval path for intercept and return (and subject to correction and a final location determination as discussed). To simplify the programming, processor 38 can be programmed to commence with a zero-velocity state for a first video frame detection at the net, with sensor(s) 36 positioned to scan the programmed areas 46. A ball hitting the net and its motion stopped thereby will thus enter the field of view with its velocity initially zeroed, simplifying the video processing required.

In another approach, sensor(s) 36 can comprise a pan-tilt-zoom (PTZ) camera using a conventional, off-the-shelf webcam for object tracking, but as this necessitates a motor-assembly, it does involve additional complexity/cost and increases the power overhead. In an exemplary application, it may utilize a conventional Fast Compressive Tracking (FCT) algorithm with capabilities including programmed learning, fast computation and robust performance, and can further include a program interfaced with embedded system through serial RS232 to command the camera motor(s) for centering the image in the current frame. The programming instructions can then interface with the directional command to retriever 12 to direct it to a ball location with improved precision.

The invention in some embodiments includes the utilization of Robot Operating System ("ROS")/Ubuntu programming protocols that utilize camera imaging using open-source programs and tool suites, which include fiducials or fiducial markers (defined above). A fiducial marker or fiducial is an object placed in the field of view of an imaging system which appears in the generated image for use as a point of reference or a measure. It may be either something placed into or on the imaging subject, or a mark or set of marks in the reticle of the optical instrument. "Fiducial" may be viewed here in a broad sense, so as to include identification/recognition/print by the robot camera/image processor of not just a ball when preparing for/commencing ball retrieval(s), but also other fiducials, including a hand, racket/racket face, and player gesture that in combination with programmed instructions upon execution direct a ball release. Similarly, fiducials can include a marker or device attachable to a player or player's equipment for selectively triggering robot responses (optionally interfaced and GUI-programmed for flexibility of use). The Ubuntu-fiducial protocols can be programmed to interface with the voice and command protocols discussed herein as desired.

Other fiducial applications may include the use of multiple cameras on retriever 12 or elsewhere for providing spatial differentiation with fiducials located at select spatially-differing positions (e.g. relative to the vertical 'y'-axis), eliminating the need for one or more servo motors in a TPZ (tilt-pan-zoom) using just a single camera covering multiple fiducials. This setup could decrease servo-motor noise, and wear and tear, with system complexity essentially unchanged albeit using other, substitute components. For example, capturing, processing, and printing an image of a loose ball fiducial on the court surface occurs on a lower imaged x-z plane than a higher fiducial—e.g. the player's arm or racket. Accordingly, to reduce/eliminate pan-tilt/zoom servo motor operation noise in the retriever, positioning and utilizing 2 or more cameras on the retriever, net post, or another desired location or combination thereof, and focused on spatially-differently-positioned fiducials, is within the scope of the invention.

As discussed above, retriever 12's ball proximity sensor 42 (included on some embodiments of system 10) complements ball tracker/locator 34 when the latter is positioned off-board and for ball collection outside its range (or in the on-board basic configuration as the sole ball locator). As discussed above, system 10 includes a player remote control device 60 with a transmitter (or transceiver) 62 for transmitting ball tracker/locator 34 system override/retrieve commands. Remote control 60 may be configured like a Wiimote to direct the retriever 12 in the desired direction of travel toward an off-court or other ball simply by moving and rotating the remote, as further discussed below. In the multi-sensor directional handoff system 10 configuration discussed above, upon arriving in proximity to the ball and within range of sensor 42 directional control of retriever 12 is handed off to process the input from sensor 42 for ball retrieval and ball return it to the signaling player, then the return to standby location. Since it is anticipated that there can be retrievals when retriever 12 encounters some kind of off-court obstruction as discussed above, sensor 42 is either capable of differentiating between a ball and an obstruction or alternatively as discussed above system 10 programmed to abort a retrieval operation in progress, e.g. by activating its "retrieve fail" protocol.

The Wii Remote-style configuration and control can be implemented using techniques such as Richard Ibbotson's Wiimote Bluetooth code (Appendix 'A', infra). For example, it has been modified to control robotic devices and an RC car. The Wiimote senses acceleration along three axes using an ADXL330 accelerometer and utilizes a 16 KiB EEPROM chip from which a section of 6 kilobytes can be freely read and written by the host. The Wiimote using two AA batteries can operate for up to 60 hours when using just its accelerometer functionality. Other devices such as the Yuneec Wizard Wand, a one-handed positional drone controller, provide similar functionality. Changing the angle of orientation of the remote control controls the devices' locomotion and/or 3-D movements via WIFI.

Operationally, such remote devices enable the translation of the device movement into commands to a user interface, in system 10 via WIFI such as Bluetooth communication protocol. The device's sensors' x-axis attitude (roll), y-axis elevation (pitch) and/or z-axis heading (yaw) motion of the device are translated into directional steering commands of retriever 12. In addition, some exemplary embodiments of the present invention can also measure linear movement of the device along the x, y, and z axes to generate user interface commands.

Multiple combinations of sensors can be used to achieve the desired control and functionality. For example, two rotational sensors and one accelerometer 506 can be employed. The rotational sensors can, for example, be implemented using ADXRS150 or ADXRS401 sensors made by Analog Devices. It will be appreciated by those skilled in the art that other types of rotational sensors can be employed as rotational sensors and that the ADXRS150 and ADXRS401 are purely used as an illustrative example. Unlike traditional gyroscopes, these rotational sensors use MEMS technology to provide a resonating mass which is attached to a frame so that it can resonate only along one direction. The resonating mass is displaced when the body to which the sensor is affixed is rotated around the sensor's sensing axis. This displacement can be measured using the Coriolis acceleration effect to determine an angular velocity associated with rotation along the sensing axis. If the rotational sensors have a single sensing axis (as for example the ADXRS150s), then they can be mounted such that their sensing axes are aligned with the rotations to be measured. One rotational sensor can be mounted such that its sensing axis is parallel to the y-axis and the other rotational sensor mounted such that its sensing axis is parallel to the z-axis. The operation and other details of the sensors are described in U.S. Pat. No. 9,575,570, "3D Pointing Devices and Methods", issued Feb. 21, 2017 (Liberty et al), and incorporated herein by reference.

In a stripped-down version of system 10 or should ball locator system 34 and processor 38 malfunction, lose power, or a player simply opts to go without these components, remote 60 may be employed to manually control and direct retriever 12 in retrievals. Since players in many matches (especially outdoors) switch court sides every two games, system 10 preferably includes a directional response capability in the sense that retriever 12 is directed to the desired court side and not the other. Voice command can provide this as discussed, or T/R 43 (specifically, its receiver component that as discussed can be dedicated or stand-alone) as well as transmitter 62 can be configured to incorporate this functionality. Since sensing a ball proximate to the net (as opposed to at a distance from the net) can result in increased false positives (the frequency of which also depends on the sensor types), a default initial retriever 12 path initiated parallel to and alongside the net can decrease these incidences. Another approach is to employ an override via the signaling player remote 60, and then reactivating sensor 42 to assume control of the retrieval after detecting the ball. After collection, retriever 12 moves toward the signaling remote 60 to release the ball either as programmed or as signaled by the remote. Upon release, retriever 12 preferably returns to its standby position automatically via communication between T/R 43 (its transmitter function) and docking station T/R 69 (discussed further below) to direct its path back. Alternatively, processor-controller 21 may include programming instructions that upon execution calculate retriever 12's position relative to the court grid of the court in play along with its standby position, or at a minimum the latter in order to return retriever 12 to its original standby position after a retrieval without undue additional manual control efforts.

System 10 preferably includes the option for a player/operator to select more than one retriever docking/standby position, via the GUI-type selection, player remote, player control device, and voice command as discussed herein. For example, the operator can choose the directional orientation of retriever 12 at standby; for example, three useful settings include a "neutral" position where the retriever 12 C/L aligns with the net's, along with two opposing orthogonal-to-net retriever C/L standby positions, with the position selection dependent on factors such as the side of the net on which to prioritize retrievals, energy efficiency considerations, and retrieval response times.

In a retriever system configuration that employs a single player employing just one remote for retrievals alternating court sides along with that player (or should the players not alternate sides periodically, or per rule or convention every other game such as after an odd number of total games played), system 10 may include a pair of receivers 63 positioned on opposite sides of retriever 12 or docking station 64. If operating on the same frequency, differentiating the desired retriever 12 direction from the unselected side of the court via relative signal power received could result in false positives due to nulling effects (caused by time path-interference or the like). Accordingly, the invention preferably includes a choice of receiver 63 "handshake" routine selecting the court side for retrievals, e.g. by deactivating the unselected receiver 63 or by way of processor-initiated deactivating or nulling out its output. This also supports a two player format, a chair umpire (or other designated person or official, including any player designees or the like); for example, one or more indicators displaying to each player the "call" status can be employed to either retrieve per that status or alternatively manually handover to the other player remote or the like. Alternatively, employing a remote 60 transmitter with 2 separate operating frequencies, one for each court side/receiver 63, also eliminates the problem (as discussed below for voice command functionality, receivers 63 may include an audio pickup component, e.g. a microphone).

Another approach in singles tennis (2-player game) provides each player a remote 60 with a unique RFID or other means for system 10 to differentiate between the two remotes. System 10 then includes means for determining which remote 60 controls a retrieval, as well as including programmed instructions that upon execution direct retriever 12 toward the designated court side (or for an off-court retrieval). System 10 accordingly may be configured to identify which court side is associated with which remote 60 at any time, notwithstanding court changeovers. Remote and/or voice commands from a remote can then be conveniently integrated in the programming instructions with the commands for the selection of which court side is desired for a retrieval to avoid misdirected retrievals. For employing just a single retriever for a 2-player court, system 10 can further include monitoring the running total of each player's power usage for their retrievals in the course of a match, with each player's consumption updated and made available as desired via data streaming to the player remotes or other means, e.g. configuring indicator 48 or 65 (described below) with this additional capability, or via periodic haptic or other alerts. A power budget allocation, e.g. equal for each player or another ratio if desired, can be selected as an input into the microprocessor, with programming to interface with the player alert or other programmed-in functions, such as a player cutoff upon reaching the allocation.

Remote 60 should be of a size and weight amenable for a player to carry it on their person during play, therefore its design should also factor into these considerations. On-board proximity sensor 42 may be an ultrasonic device or a video device, input to processor-controller 21 and in the case of video input processed as discussed herein as with processor 38 processing of video input except that the processing overhead may be decreased given the reduced ball recognition demands. Also, upon sensor 42 acquiring the ball location, an on-board indicator 65 signals ball acquisition audibly or visually to alert the signaling player that manual remote control of retriever 12 converts to automatic subject to user override. Alternatively, or additionally, sensor 42 may be employed to sense other proximate objects, e.g. for obstacle avoidance and steering command control.

The invention optionally includes voice control and command technology as manual control over retrieval actions or other functions in system 10. This can be integrated with processor 38, remote 60, or combined in both. Voice commands can serve as overrides and as user-selected options and for system setups or configurations and are much less intrusive and distracting to adjacent court players when compared to the much louder and frequent score announcements during a match. Exemplary voice commands include "Retrieve" and the like for directing retriever 12 to start a retrieval, "Side A (or B)" followed by "1 (or 2)" and the like to designate which [predesignated] court side and which court area to retrieve on, then "More" or "Less" or other suitable directional/steering commands to direct the immediate heading and path of retriever 12 toward a ball until it's on course, as is further discussed below. Balls more proximate to the docking station/standby retriever position can be approached at a slower velocity that more distant retrievals, providing the operator adequate time to apply course and heading correction instructions/signals, e.g. by voice command, until the ball proximity sensor "locks in" on a loose ball (upon which the retriever indicator light or a remote function indication). "Off court" and such when directing the retriever outside a programmed grid area (e.g. outside the immediate court in play), "Collect [number of balls]", "Stop", "Standby", and other such commands to facilitate effective and efficient retrievals. Commands can be incorporated into the programming of remote 60 for implementation by remote control components such as a "TrackPoint" (a compact, isometric joystick, also known as a pointing stick, style pointer, or nub), a GUI interface, a mousepad, a conventional joystick, and the like.

In a preferred embodiment of the voice command-type system 10, the court of play, the areas alongside it, and adjacent courts are assigned specific alphanumeric and/or word designations convenient to voice command protocols. These commands may be selected so as not to sound like common tennis parlance reserved for other communications, such as game scores and other in-play verbal utterances (e.g. "let" or "let court", "in", "out", and so forth), audible either from the match court or from nearby courts. Court areas are also preferably differentiated by ball retrieval zones designations, for example, the area between adjacent courts that includes retriever 12's standby location (applying a command such as "Off" for a retrieval outside the lines on the side with the retriever, "Off-Far" indicating the opposite-side counterpart, and side "A" or "B" for the player's side on which to retrieve). Since most on-court retrievals will be in the service boxes on up to the net, and with each court side being a mirror image, subsequent command information can designate an approximate location for either side relative to a corresponding programmed-in court grid that may also include adjacent areas.

One grid according to the invention is to assign equally-spaced rows dividing the service boxes from the net to the service lines and extending into the side court areas on both sides, for example, 5 rows. Each row is assigned a voice command callout, e.g. the numbers 1-5 from the net to the service box back line, the command "net" then "1-4", or "net", then "1-3", then "line". Columns add to the precision, but for ease of use while maintaining sufficient precision in the retrieval path (taking into account the typical spatial and cognitive grid visualization capabilities of the typical player/operator) an approximate row distance callout should suffice. Additional voice commands directing retriever 12 to "slow", to turn ("left" or "right"), and then "straight" or "good" for the retriever to maintain that heading toward the ball correct these approximations to obtain a successful retrieve. Programming can also include automatically slowing the retriever as it approaches the command retrieve location until receiving additional voice commands or a retriever sensor locks onto the ball to assume fully automatic control.

The programmed grid also preferably includes areas back of the described forward court grid areas and can be distinguished using a command "back" or such along with a back row numbering system to direct retriever 12 for back retrievals. An exemplary back court row designation is 1-3 commencing from the service box back line, essentially mirroring the front court grid configuration. The programmed retrieval grid may include adjacent courts, e.g. "Next" for indicate an adjacent court, "Third" for another court away, and so forth. A command to "Hold" or "Stop" directs retriever 12 after retrieving a ball to delay the ball release; a command such as "And" directs retriever 12 after releasing the first retrieved ball to await another command such as a second ball location retrieve command instead of automatically returning to standby. Commands also can include "abort" or "standby" for retriever 12 to terminate a retrieve and return to standby. Some retrieves may be amenable to part or fully manual mode, at least until and after ball release (then auto return to standby whenever feasible or optimal).

Alternatively, a smartphone or similar device with an installed retriever app can serve some or all these functionalities, including the remote functions as well as the voice control/command functionality, which may be preferable in avoiding erroneous movement resulting from extraneous noise sources. As discussed above, voice command functionality may be integrated into the player/operator remote control to communicate with one or more system 10 receivers 63 positioned on the retriever or docking station for controlling retriever 12 via the voice commands. Alternatively, receivers 63 may include one or more audio pickups/microphones for receiving and signal-conversion of umpire/non-player voice commands input to the processor which via programmed instructions upon execution output retriever 12 control signals. The programming can include programming-in various predicative factors, that is, desired play-cueing inputs, examples of which include automatic (and GUI-adjustable) end-of-point-play computations, play/serve resumption, and game status based on game score announcements and the like, that may determine a retriever 12 standby status.

Commercially available voice command control interface software includes VRBot (Tigal Inc.), comprising a module with voice recognition functions for built-in Speaker Independent (SI) commands and up to 32 user-defined commands (Speaker Dependent (SD) trigger or commands, along with voice passwords (SV)). Other useful voice command/recognition technology is described in U.S. Patent Application No. 20150095026, Bisani et al., Apr. 2, 2015 (hereinafter "Bisani"), and incorporated herein by reference. Bisani describes an automatic speech recognition (ASR) processing system, in which the ASR processes speech based on multiple channels of audio received from a beamformer. The ASR processing system includes a microphone array and the beamformer to output multiple channels of audio such that each channel isolates audio in a particular direction. The multichannel audio signals may include spoken utterances/speech from one or more speakers as well as undesired audio, such as noise from a household appliance. When receiving audio for speech recognition processing, an ASR device may receive both desired audio, such as speech from a user, as well as undesired audio, such as audio from other people talking to each other, noise from household appliances, etc. In certain circumstances, the speech may be coming from a different direction than the noise. To isolate audio coming from different directions, a device may perform beamforming, a process of isolating certain audio inputs using multiple audio input devices. To perform beamforming, a device may include components for direction-based processing, such as the microphone array and related components. The directional based-processing components may be local to the microphone array and/or may be separate but coupled to the microphone array. The microphone array may be fixed or steerable. When steerable, the microphone array may allow for electronic focusing, where data processing techniques may be employed to focus the microphone array on audio coming from a particular direction, known as a beam. Such steering may be used to isolate the user's speech by focusing the ASR processing on audio received from the direction of the user. System 10's voice command subsystem preferably includes the described beam steering (given that the direction of audio commands from the player(s)/operator(s) is known) when employing the microphone array. The audio from the selected direction is preferably processed to improve voice command recognition and accuracy, such as adjusting signal-to-noise ratio depending on the voice command direction. Other techniques such as reverberation, echo cancellation, etc., may also be used to improve the reception of the desired audio. The ASR device may simultaneously perform speech recognition on the multi-channel audio to provide highly accurate speech recognition results.

The identification of a voice command is preferably optimized by simultaneously performing speech recognition in different directions to isolate the desired speech based on decoding multiple channels of audio. Receiver(s) 63 (or other suitable audio pickups as described) may also receive interfering audio from different sources and directions, which can be identified and selectively eliminated from the voice commands that corresponds to the programmed-in system voice commands in order to select that as the retriever 12 control commands. the speech recognition results/audio from that direction for further processing. Accordingly, system 10 may include a beamformer module to receive audio signals from a plurality of sources from different directions and simultaneously perform speech recognition in the different directions to isolate the desired voice command. Of course, if voice command is local to the player/operator, e.g. built into the player remote or other personal device, then this more elaborate system is not required.

A 2-microphone array system is described in "Frequency Domain Multi-Channel Acoustic Modeling For Distant Speech Recognition", Wu Minhua, K. Kumatani, S. Sundaram, N. Ström, and B. Hoffmeister (IEEE International Conference on Acoustics, Speech and Signal Processing 12-17 May 2019), and "Multi-Geometry Spatial Acoustic Modeling For Distant Speech Recognition", K. Kumatani, W. Minhua, S. Sundaram, N. Ström, and B. Hoffmeister (IEEE International Conference on Acoustics, Speech and Signal Processing May 2019), and is also within the scope of the present invention. System 10 may also include tracking means attachable to one or more tennis players for communicating to the retriever a ball release location. On-board proximity sensor 42 for many embodiments may be a less complex type sensor than sensor(s) 36 since sensor 42 will typically not have to acquire (sense) a ball until close-by, given that sensor(s) 36 in cooperation with processor 38 and its vision program is capable of directing retriever 12 sufficiently close to a ball; consequently, less sensor (as well as less processing) sophistication is necessary. For example, a video sensor 36 and processor 38 (and/or processor-controller 21) programmed to employ naive color thresholding utilizing the ball color (optical yellow) is typically effective for optical yellow balls against varying court background colors up to within close range (1-2 meters) of on-board sensor 42 for hand-off. Sensor(s) 36 alternatively comprises an ultrasonic range sensor, such as the LV-MaxSonar-EZ1 ultrasonic range finder.

As shown in FIG. 2, system 10 may include a retriever 12 docking station 64 that can further include a means 66 for charging retriever 12's power supply 22, e.g. a Li-ion, Ni-MH, or other type of rechargeable battery, and thus extend retriever 12's operational range and duration during a match. Power supply 22 is selected based on the design's desired power and useful operating time, as well as on the availability of in-use recharging options as noted. One such system is that often utilized by RC model cars, a rechargeable Ni-MH 4.8 V battery packs, readily switchable with standby fully charged replacement packs. Other power supply 22 options include those utilized in electric scooters, electric bicycles, and motorized child ride-in vehicles, the rechargeable power supplies for which vary in voltages from 12 V-48 V, and include various types as already noted. Means for charging 66 may accordingly include several different options, which may also depend on the intended use, e.g. an AC-outlet-stepdown transformer for an indoor court setting or if outdoors a solar cell and associated circuitry optionally incorporated into docking station 64. Retriever 12 can be programmed to return to whichever post is closest to its current ball returning location, although a preferred standby is in a docking station as discussed herein with a separate, connectable power supply for recharging the retriever on-board power supply between retrievals while docked. An exemplary charging interface is a conventional induction coil noncontact-type charging system with the requisite complementary circuitry provided in the two components (retriever and docking station). Tennis facilities (especially indoor) may opt to provide wired outlets to provide power.

The docking station also helps secure the retriever and itself can be secured to a net post; accordingly, either docking station 64 can include means 67 for securing/releasing to a net post, or in a more basic configuration absent the docking station, retriever 12 can include the means 67 for securing/releasing to a net post, e.g. to secure it in windy conditions. For example, means 67 for securing/releasing retriever 12 may be a magnetic coupling to attach/release to/from a net post 40; also, means 67 can be contoured (concave) to fit snuggly onto the round net post.

Figure 7:
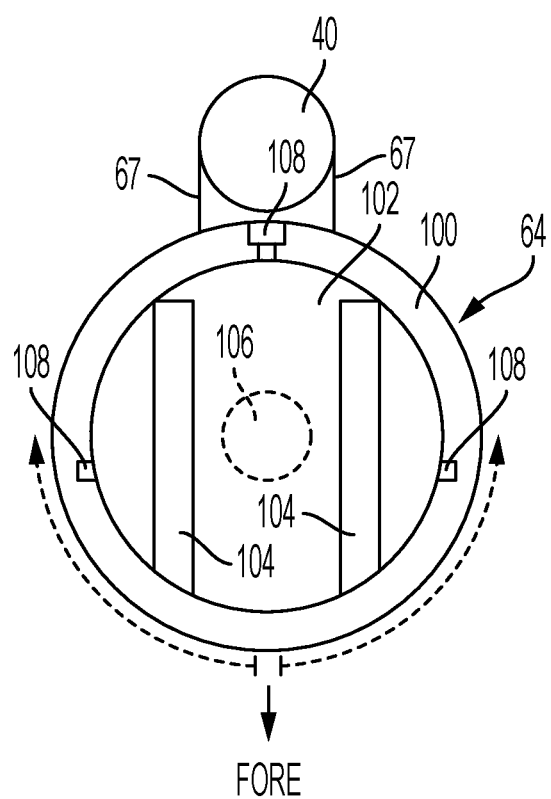
FIG. 7 is a top perspective view of a docking station according to the invention.

As shown in FIG. 7, an exemplary docking station 64 includes a base 100 with a plate 102 rotatably mounted thereon and having a pair of grooves 104 configured to guide and secure retriever 12 (via wheels 18) between retrievals in a retriever-standby position (indicated by the FORE arrow). Docking station 64 may also include a means 106 for rotating plate 102 between positions (as illustrated by the dotted lines), e.g. a stepper or other motor, or rotation can be effectuated by synchronized opposing rotations of one or more wheels 18 within grooves 104. Structural detents 108 may be included to define/limit the degrees of rotation of plate 102 (the net post 40 itself may serve in this capacity, in conjunction with other design aspects such as contact with blades 26). Alternatively, the amount of rotation can also be controlled directly via means 106 or system 10 can be programmed and/or manually controlled to rotate plate 102 to orient retriever 12 in the desired direction and into its orientation for redocking retriever 12 after ball release (where retriever 64 may travel in reverse and redock without unnecessary additional turning). Retriever location determining means 19 in cooperation with proximity (or homing) sensors can facilitate redocking in accordance with system programming.

Figure 8:
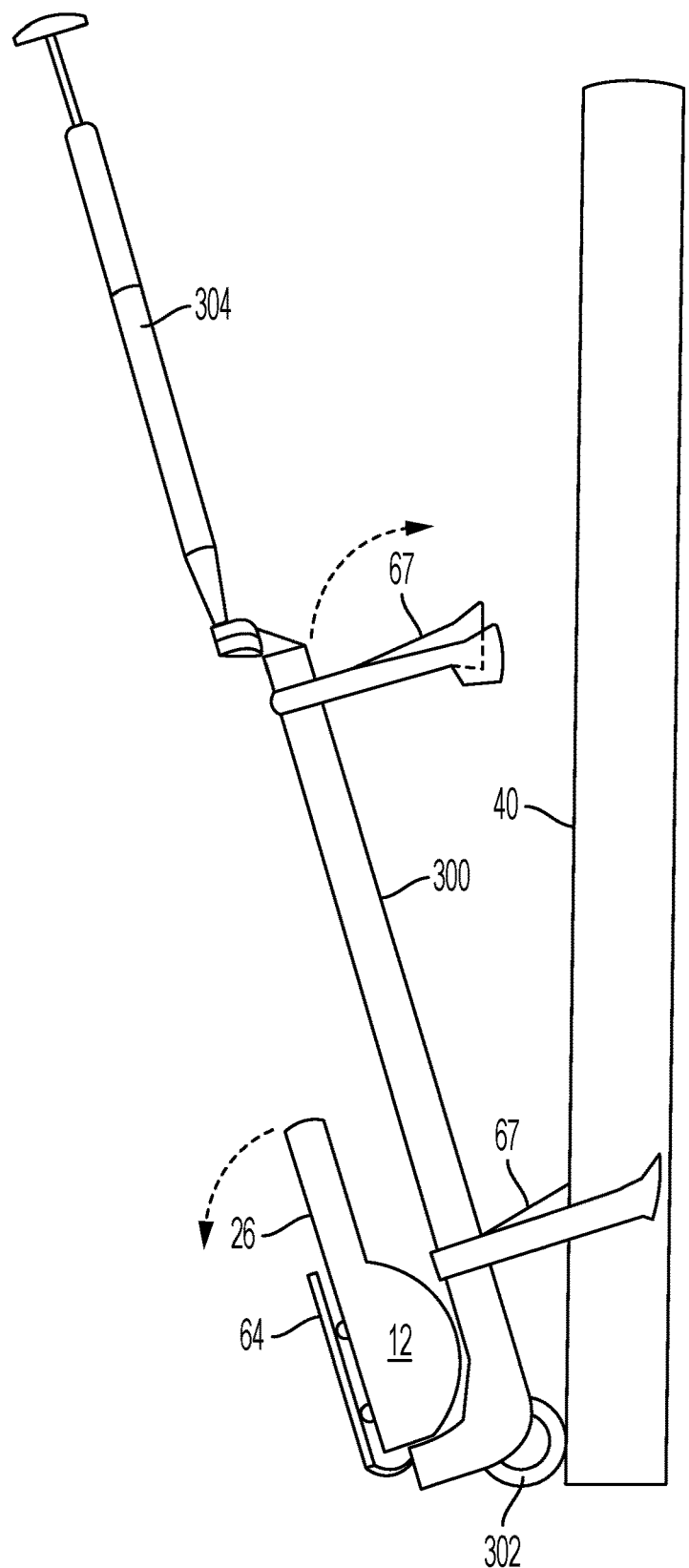
FIG. 8 is a side elevation view of a retriever with docking station on a cart according to the invention.

FIG. 8 illustrates a portable embodiment in which retriever 12 and docking station 64 are attached/secured together on a rollable frame 300 that comprises wheels 302, a telescoping handle 304, and means 67 for securing frame 300 to the net post 40. The configuration facilitates transporting, setting up, and stowing system 10; it also provides an open space in the middle in which to secure and hold a player's tennis equipment bag or other gear. Retriever 12 can be stowed in a folded-up position (with blades 26 alongside frame 300) for compactness and rotated into its working position (as depicted by the arrows) with frame 300 secured to the net post 40.

As discussed, processor-controller 21 can be programmed to compute and track paths and distances to track retriever 12's ball-release location and return it to the standby location. Docking station 64 preferably includes a T/R (transceiver) 69 to assist in docking maneuvers; alternatively, transceiver 44 can have this functionality.

Retriever 12 may have a sealed housing 15 for outdoor use in order to protect its components from moisture and other elements, e.g. debris as well as material from loose court clay surfaces, including rubico (Har-Tru), composed primarily of crushed metabasalt, or red clay (crushed brick or clay, crushed shale, stone, brick, or other unbound mineral aggregates). A sealed housing 15 also facilitates cleaning and hosing off retriever 12 after use. Since these surfaces comprise loose surface material, it may be preferable to utilize for these applications a version of retriever 12 employing passive detents 50, 51, and others described herein, as opposed to the more complex active detents that may be susceptible to diminishing performance and may also require more frequent maintenance and repair due to the introduction and accumulation therein of the soft court surface material.

Steering means 20 may comprise differential drive/differential wheel: the velocity difference between two motors drive the robot in any required path and direction is "differential drive"; "differential wheel" can employ two independently driven wheels fixed on a common horizontal axis. Another option is a "tricycle drive, employing three wheels with a fore steering wheel controlled by a motor and the two rear wheels attached to a common axle driven by a single motor with two degrees of freedom (either forwards or reverse). Steering means 20 may also be an "Ackermann" design that mechanically coordinates the angle of the two front wheels fixed on a common pivotable steering axle with the two rear wheels on a second, fixed driving axle. Retriever 12 may also comprise continuous track (also called tank tread or caterpillar track) treads in lieu of wheels 18 to facilitate movement on loose tennis court surfaces, for which a robot tread-drive ("tank drive") system may be utilized. Means for steering 20 then employs differential steering (movement is based on two separately driven wheels), applying more or less drive torque to one side of retriever 12 than the other to turn; this adds complexity and increases cost, requiring one or more additional motors and additional drive train components compared to non-track drive systems. An additional consideration for the soft court surface is to avoid or minimize the possible effect of leaving tracks on the surface from the retriever movements, accordingly, retriever 12 can include a means for smoothing out or otherwise grooming the track marks such as a brush affixed to the rear of the housing or chassis and set at a level so as to smooth out the tracks while also minimizing the drag associated with its contact with the surface. Other modifications may be desired for grass court surfaces, such as an auxiliary ground release impeller (described herein) and a ball support for collected balls (also described herein) due to uneven rolling on grass during retrievals.

Of course, the choice of materials for retriever 12 depend on several considerations, including cost, weight, and overall utility in the various courts and conditions where it is used. The wheels and their traction are important to retriever 12's mobility and acceleration capabilities, therefore the coefficient of friction between the wheels and the various court surfaces is a factor. This may dictate a low-profile tire/wheel employing a neoprene or other such material having a medium durometer and/or sufficient tackiness to enjoy a good surface grip. The weight of retriever 12 may also be a factor, as retriever 12's weight is a compromise between a heavier chassis aiding both traction and stability against outside forces such as wind versus a lower weight maximizing its acceleration, speed, and time-efficient court coverage.

Possible court conditions include rain interruptions as well as play during windy conditions. As noted above regarding the former, retriever 12 has a water-resistant design; regarding the latter, retriever 12's lateral surface areas are preferably minimized to reduce the effects of wind, in particular cross-winds, on its retrievals so as to minimize retrieval times and the occurrence of mis-retrievals and the like. Although housing 15 of course has a configuration and size in accordance with system 10 and retriever 12's respective designs and functionalities, it preferably presents a profile, especially regarding its cross-sectional areas, minimizing the potential impact of windy or gusty conditions when used outdoors, and to which opposing blades 26 are a sizeable contributor. It is therefore desirable to minimize the overall cross-sectional surface area of opposing blades 26. Accordingly, opposing blades 26 may have multiple through-holes or slots 68 through sidewalls 31 or comprise a loop with narrow walls and one large slot 68. Obviously, the clearance therethrough of each slot or through-hole 68 must be smaller than the ball's diameter (provided above). Blades 26 should extend at least 3 inches with respect to retriever 12's axial C/L (see FIG. 4) from housing 15 in order to define a collection space 30 sized to retain a single ball; in multiple-ball versions blades 26 extend with respect to the C/L at least those multiples thereof; accordingly, retriever 12 in some embodiments discussed herein may be configured to accommodate up to 6 balls or more (e.g. for tournaments or other situations utilizing same). Sidewalls 31 of blades 26 should have a vertical height dimension sufficient to retain/release a ball or balls in/from space 30, which may depend on the embodiment. Thus, sidewalls 31 are configured so as not to trap or hinder the ball for release but rather to position it on the ground at release with the blades then guiding the ball toward the intended release point. For example, it may suffice for an embodiment of blade 26 comprising passive detent 50 and upper lip 56 to have a vertical height dimension somewhere between the radius of the ball and its diameter (about 1.4 inches to 2.7 inches), although the height should be at least sufficient to accept the ball into space 30 without it getting stuck prior to release.

Opposing blades 26 and housing 15 are either a one-piece construction mounted on chassis 15 or blades 26 are a separate component(s) attached to housing 15 (and/or chassis 14) via a fastening means 70. Fastening means 70 in one embodiment is a latchable hinge allowing opposing blades 26 to be rotated (as illustrated by the dotted lines in FIG. 4) between a ball-collecting position and a folded-back, stowable position. Other suitable fastening means 70 include a slotted (slide-in/slide-out-type) bracket or other such quick-connect; alternatively, blades 26 can be retractable blades 26 e.g. configured to slidably retractable within guides along the top or sides of housing 15.

Figure 9:
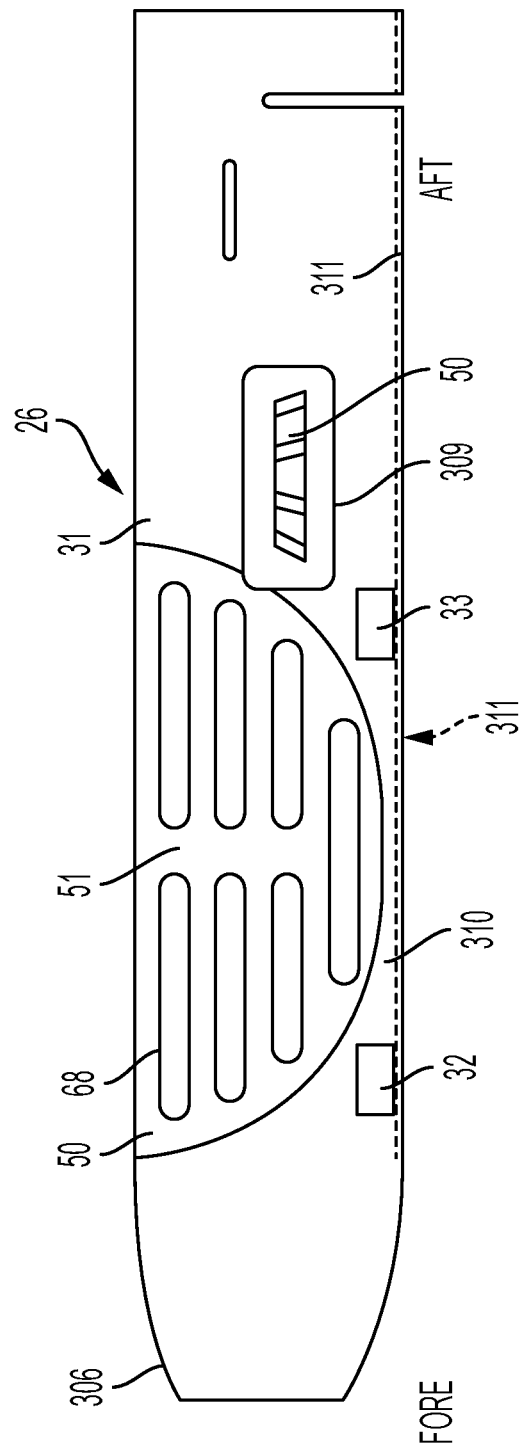
FIG. 9 is a side elevation view of a blade according to the invention.
Figure 10:
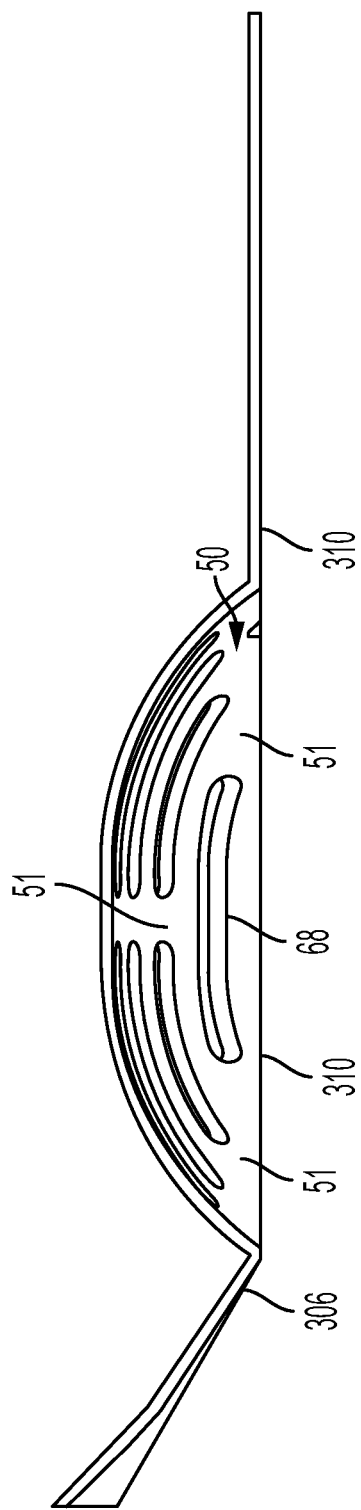
FIG. 10 is a top elevation view of a blade according to the invention.
Figure 11:
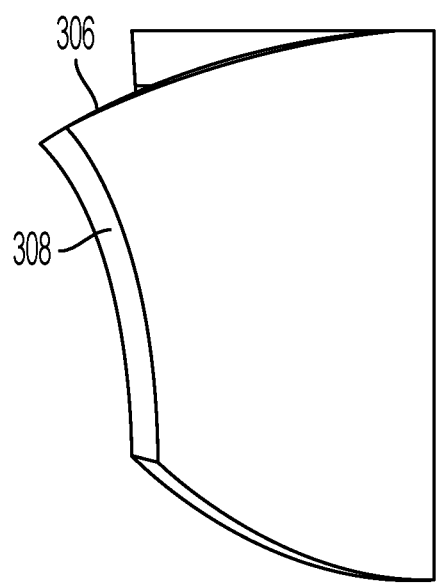
FIG. 11 is a front elevation view of a blade flare end according to the invention.
Figure 12:
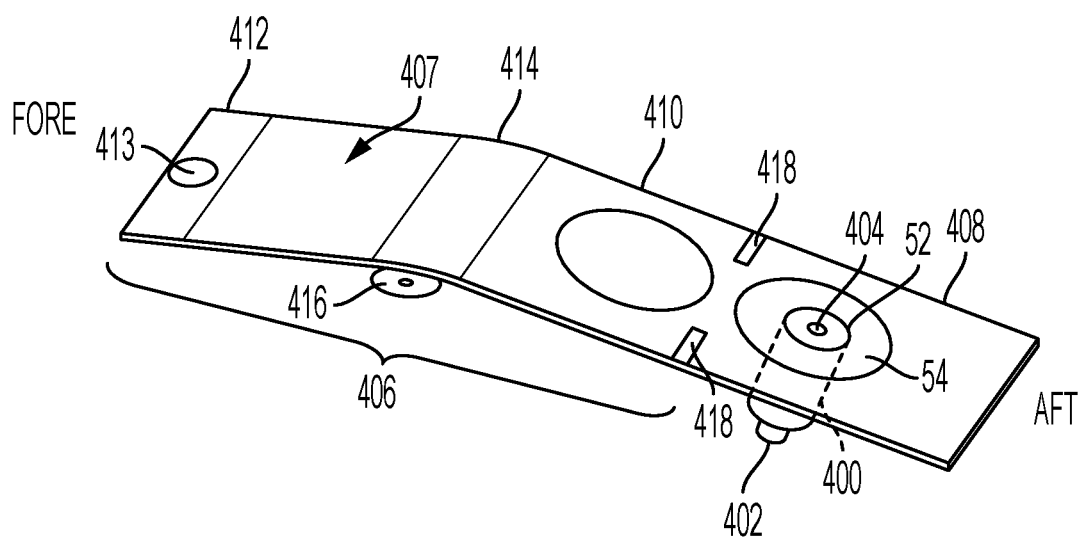
FIG. 12 is a top elevation view of a ball ejector-ball feeder/ball ramp according to the invention.
Figure 13:
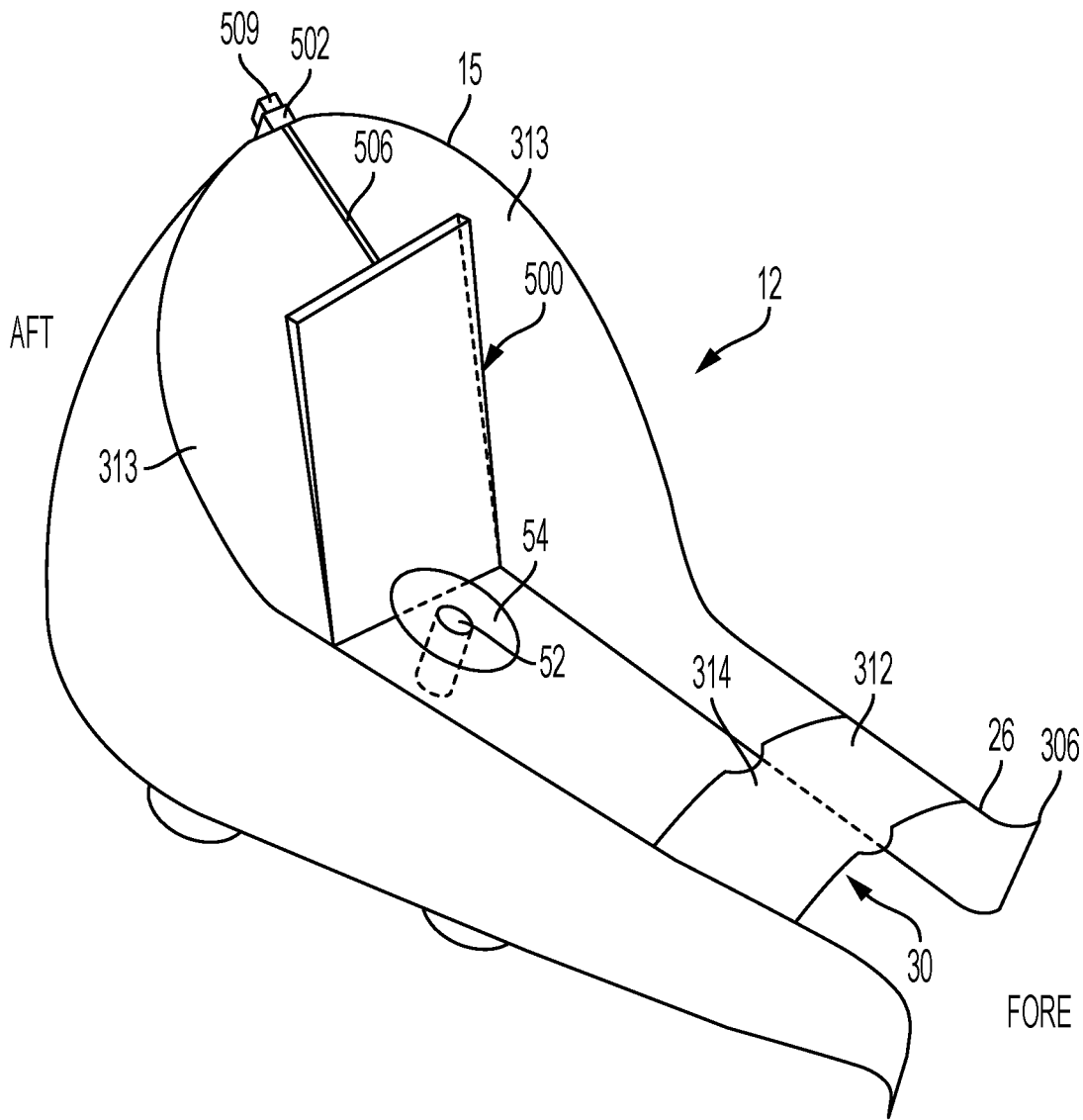
FIG. 13 is a top elevation view of a retriever according to the invention.
Figure 14:
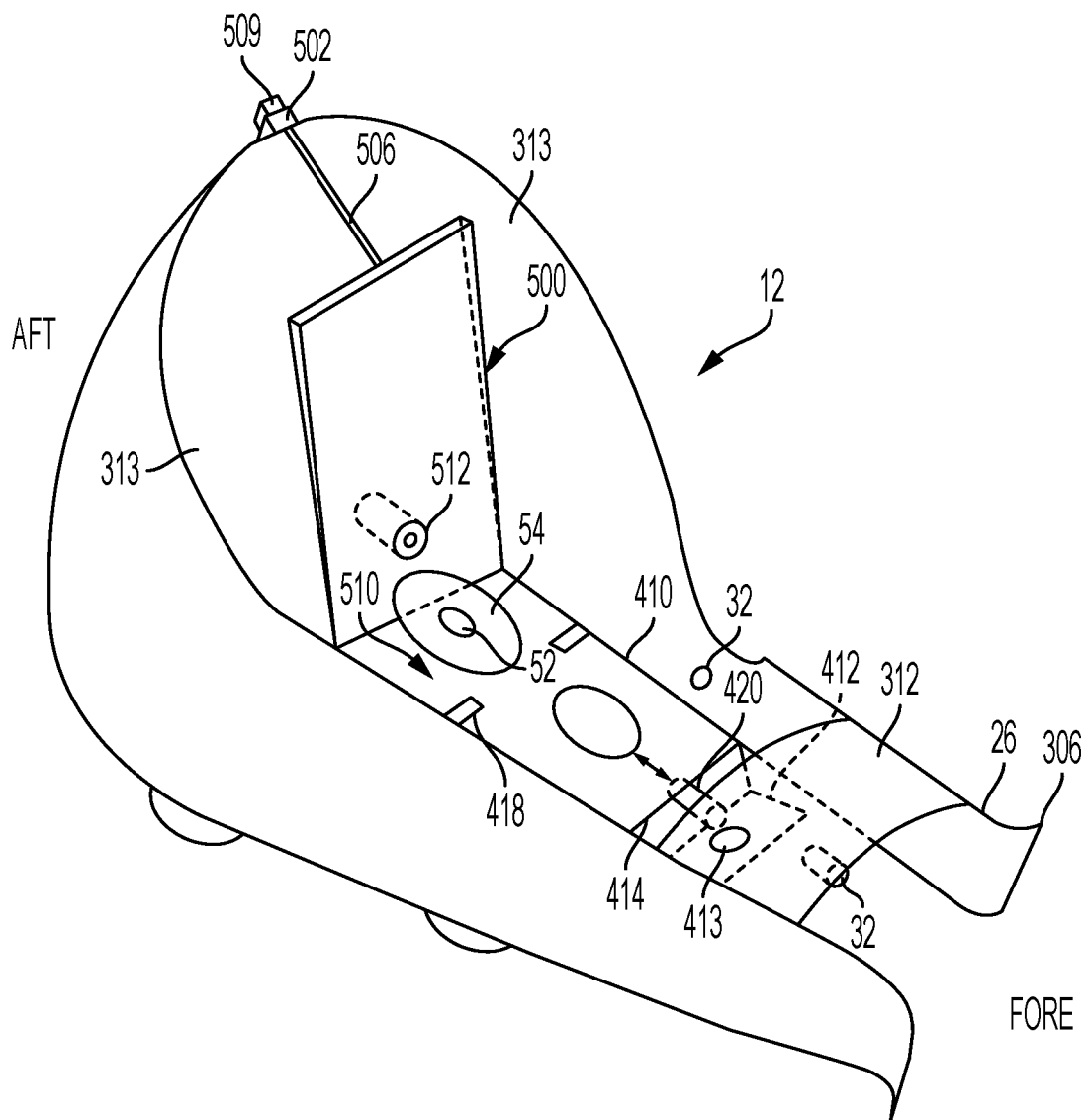
FIG. 14 is a top elevation view of a retriever according to the invention.

FIGS. 9-11 show an embodiment of blade 26 that includes a flared-out (leading) end 306 angled to deflect a ball into the collection space 30 and broaden out the ball collection swath on both sides of retriever 12. Blade end 306 may be tapered as shown, the amount of which is limited so as not to allow a ball to slip over or under given a ball diameter of ≈2.7". Blade end 306 may also be twisted as shown (like a mobius strip twist) in order to present a leading edge surface 308 that is parallel (in the y-z plane) to retriever 12's to minimize end 306 snagging in the net (the mesh or on the center tie-down strap) when the retriever is it a preferred initial retrieval path running parallel to and alongside the net; this also lends to a preferred programmed instructions whereby processor-controller 21 based on retriever movement input data detects an unprogrammed stop or deceleration during a retrieval and directs a corrective maneuver such as a course reversal (subject to manual override). Blade end 306 can have a width (e.g. larger than 2 of the mesh openings) sized to minimize catching/snagging in the net mesh. Passive detent 50 is concave area 51 extending upward from a lower horizontally-extending ball guide blade section 310 (vertically, at least $\frac{1}{8}$"-$\frac{1}{4}$" in height) that together with its opposing blade's ball guide 310 guides a ball at release from space 30 towards the target, while keeping it from riding back into area 51 and thereby maintain accuracy at ball release. Each blade 26 preferably includes a wiring channel 311, e.g. a longitudinally-extending groove (shown in phantom) on the underside of each blade connected via through-holes or ports to sensors or other components (e.g. LEDs 29) positioned on blades 26.

Blade 26 is shown with a slot 309 positioned aft of ball proximity sensor 33 for accommodating an additional, active detent 50 (e.g. a robotic claw as illustrated in FIG. 9) for selectively securing and releasing a ball, providing retriever 12 with multi-ball retrieval functionality on a single retrieval "round trip". Multi-ball retrieval can also be provided by the other passive and active detents described herein, the choice of which depends on the desired system 10 design.

Blade-mounted ball sensor 32 upon detecting balls' movements in and out of space 30 signals inputs into processor-controller 21 for controlling retriever 12 maneuvers and ball retrievals as discussed. For example, upon collecting a ball, retriever 12 can either commence a ball release operation or another ball collection operation as directed, and upon completion commence the next programmed or directed operation, usually ending with its return to standby and/or docking station 64. A proximity sensor positioned on top of the retriever or on each blade can help maintain a desired distance on retriever approaches alongside the net, e.g. to maintain a programmed distance away from the net. Alternatively, a sensor centrally-positioned and mounted above the blades, e.g. on the front roof of the retriever, at a specified range detects the ball and directs the retriever toward it but so as not to override the blade sensor protocol but to apply an adjustment to close in on the ball upon it being picked up by the sensor at a programmed-in delta distance gap as directed by the central proximity sensor.

The number of such proximity sensors may be minimized or consolidated by configuring system 10 to utilize a sensor so as to "recognize-differentiate" a sensed, proximate object based on its present location, position, direction, and/or orientation of retriever 12 via programmed instructions and the programmed-in court grid. For example, upon the initiation of a retrieval, system 10 can be programmed as discussed herein to commence alongside the net, with a proximity sensor utilized to ensure a desired distance maintained between retriever 12 and the net until it's on a maintainable path sans proximity sensor feedback, upon which the proximity sensor output can be utilized to indicate a proximate ball or player.

FIGS. 12-16 show embodiments of retriever 12 capable of collecting a bouncing or deflected ball, with or without a ball ejector 52. The aft end of housing 15 includes interior sidewalls 313 with surfaces contoured (e.g. concave) to deflect and contain a ball on the bounce. As discussed above, retriever 12 may also include the ball ejector 52 along with a slightly concave ball support 54 (or a through hole, e.g. a ¼"-¾" hole) for collecting and passively securing a bouncing or deflected ball thereon. A ball proximity sensor 32 may be positioned in or under one or more of the ball support 54 through holes, e.g. as discussed below in the embodiment illustrated in FIG. 18). Retriever 12 can include a roof 312 to augment the detent capability of concave damping areas 51 (FIGS. 9-10) and deflect balls forward and into collection space 30. Roof 312 can also include a concave (as viewed from above) channel 314 with a fore-to-aft decline (negative slope) to funnel balls aft ward (either toward ball support 54/ejector 52 or sans this component into space 30 for ground release). Sidewalls 313 and other ball-impacting surfaces can optionally include a resilient/impact-absorbent surface treatment (e.g. texturing or ribbing) or a top layer, such as rubber, a synthetic elastomer (neoprene or urethane), or foam or the like, to dampen and absorb ball impacts and maximize capture-retention.

Ball ejector 52 may be a solenoid 400 (preferably a linear type) operating a core piston-striker 402 having a ball-striking surface 404 for striking the ball for an ejection release, such as in US Patent Application No. 2015/0061224A1, filed Aug. 7, 2014 (Ron et al), and incorporated herein by reference, that describes a solenoid striker assembly comprising a spring-biased striker member activated by a solenoid, where the solenoid moves the striker against the spring into a compressed position, allowing the spring to snap the striker against the ball upon solenoid de-energization/striker release.

Retriever 12 may also include a ball queuer/feeder 406 with a front end 407 and a back end 408 having a fore-to-aft decline (negative slope) for gravity-feeding a ball back toward ejector 52. End portion 407 (fore) has a leading lip 412 sized to receive and hold a ball on surface 413 that is configured (e.g. slightly concave) to releasably secure the ball. Lip 412 is pivotally attached to aft end 408 via a hinge 414 or other pivot means, raised and lowered via an operator 416 (e.g. a motor-gear assembly, a solenoid or the like), whereby with lip 412 lowered a ball received thereon is lifted up and gravity-fed down ball ramp 410. A ball proximity sensor 32 as described above senses a ball rolling onto lip 412 upon which processor-controller 21 initiates the feed-queue sequence, in conjunction with a means 418 for controlling the sequential feed of a ball or balls to ejector 52 such as solenoid-operated detents (or a robotic claw gripper as illustrated in FIG. 9, or back-to-back such grippers with a ball pass-through feeding capability) positioned at a height so as to secure the ball near or at its great circumference ($\approx$1.30"-1.40"); another sensor 32 adjacent ball ramp 410 senses a ball fed back toward ejector 52. In lieu of a solenoid-piston, a spring-lever arm ejector or other ejectors 52 known in the art are also within the scope of the invention. Front end 407 optionally includes a ball ejector 420 (solenoid-piston type or the like) positioned for striking and ejecting a ball horizontally/forward for a ground release as an alternative to (or supplementary in) inertial ground ball releases in some embodiments, e.g. the combination ejector-inertial (ground release) embodiment described further below. In these embodiments, retriever 12 can be configured to rely on raising up lip 412 to secure a ball pending release, to substitute for any or all the passive and active detents (e.g. concave areas 51 on blades 26).

Ejector 52 optionally may include a ball launch guide 500 positioned adjacent to and extending above ball ejector 52 for directing the ball upward in a desired release direction. Guide 500 preferably includes adjustment means 502 for adjusting the launch angle and ejected ball direction. Adjustment means 502 includes guide-urging means 504 (e.g. a solenoid-operated piston assembly or a geared worm-screw assembly) secured at one end to housing 15 and at the other end to guide 500. Guide 500 at end 507 is pivotally mounted to retriever 12 by pivot means 508 (e.g. a hinge assembly as shown). Guide 500 is then adjustable manually or via programmed instructions to guide a ball in a desired direction and trajectory. Ejector 52 can also include an adjustable force functionality to control the ball release exit velocity. Optional object proximity sensor(s) 509 can provide input for adjusting these parameters as desired for optimal performance including safety considerations (e.g. detecting a player's distance therefrom to eject the ball safely), including programmed or manual retrieval interrupts. System 10 can further include an override function to allow a player or independent operator, e.g. an official such as the chair umpire, to override at any time the proximity interlock in order to eject a ball or balls as desired in each circumstance.

Figure 16:
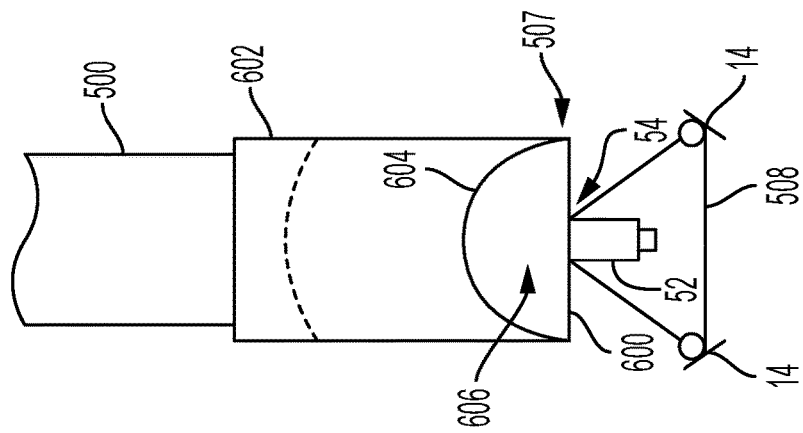
FIG. 16 is an enlarged view showing expanded details of an interior section of FIG. 15.
Figure 15:
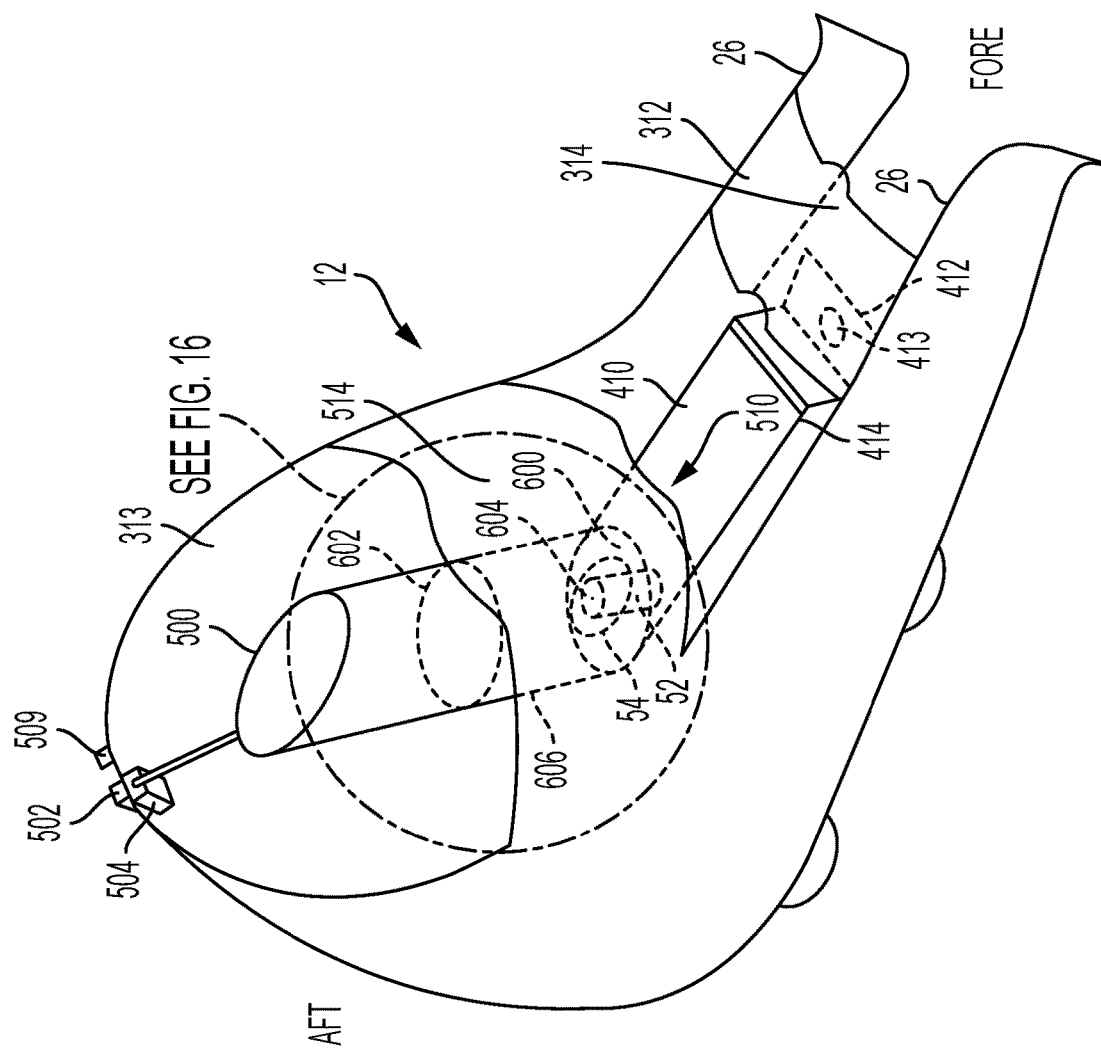
FIG. 15 is a top elevation view of a retriever according to the invention.

In the embodiment illustrated in FIGS. 15-16, retriever 12 is configured to collect both bouncing and rolling balls and can release a ball either on the ground or in the air. Retriever 12 includes the ball queuer/feeder 406 for directing balls from space 30, either aft by gravity-feed on ball ramp 410 into ball support 54 for ejection, or forward for ground release. In this embodiment, ball support 54 includes a ball support rotating means 600 consisting of a plate and a stepper motor or the like rotatably mounted on ball ejector 52, with rotation directed by processor-controller 21 and its programming/inputs. Guide 500 has a lower housing 602 secured to ball support rotating means 600 that is either (a) integral with guide 500 (such that rotating ball support rotating means 600 and guide 500 occur together), or (b) is a separate assembly (just lower housing 602 rotates with ball support rotating means 600 and not guide 500). Lower housing 602 includes a ball feed-through opening 604 at the bottom of housing 602 sized for passage therethrough of a ball (i.e. >2.7 inches diameter for a tennis ball), where opening 604 is preferably arched as shown) between ramp 410 and support 54. Rotation of ball support rotating means 600 moves opening 604 away from ramp 410 to position a wall 606 of housing 602 in line with ramp 410, to function as a detent (along with additional detents as are described herein if desired) blocking ball-feeds aft until space 34 is available for a desired ball feed. Ball support rotating means 600 is then rotatable back into position to recommence ball feeding aft. It is also noted that balls can be fed forward of space 34 in some embodiments described herein, e.g. in two-way ball feed versions. Of course, the exact timing and sequencing of ball feeds and ejections is subject to programming or manual direction as desired for a given application. The outboard surfaces of housing 15 and blades 26 preferably align along a common vertical (x-z) plane to optimize ball collections close to the net, e.g. when retriever 12 travels alongside and parallel to the net in either direction.

Another potentially difficult retrieval situation is when a ball is in or near a corner of the court (i.e. behind the baseline). In order to alleviate this retrieval issue, the invention includes means (not illustrated) to block or deflect balls from the corner, e.g. a triangular-shaped block or a strap (e.g. a bungee-style cord) affixed onto the fencing on both sides of the corner to block off the corner and deflect the balls. Alternatively, retriever 12 may include a means for grasping and securing a ball as is further described below.

Figure 17:
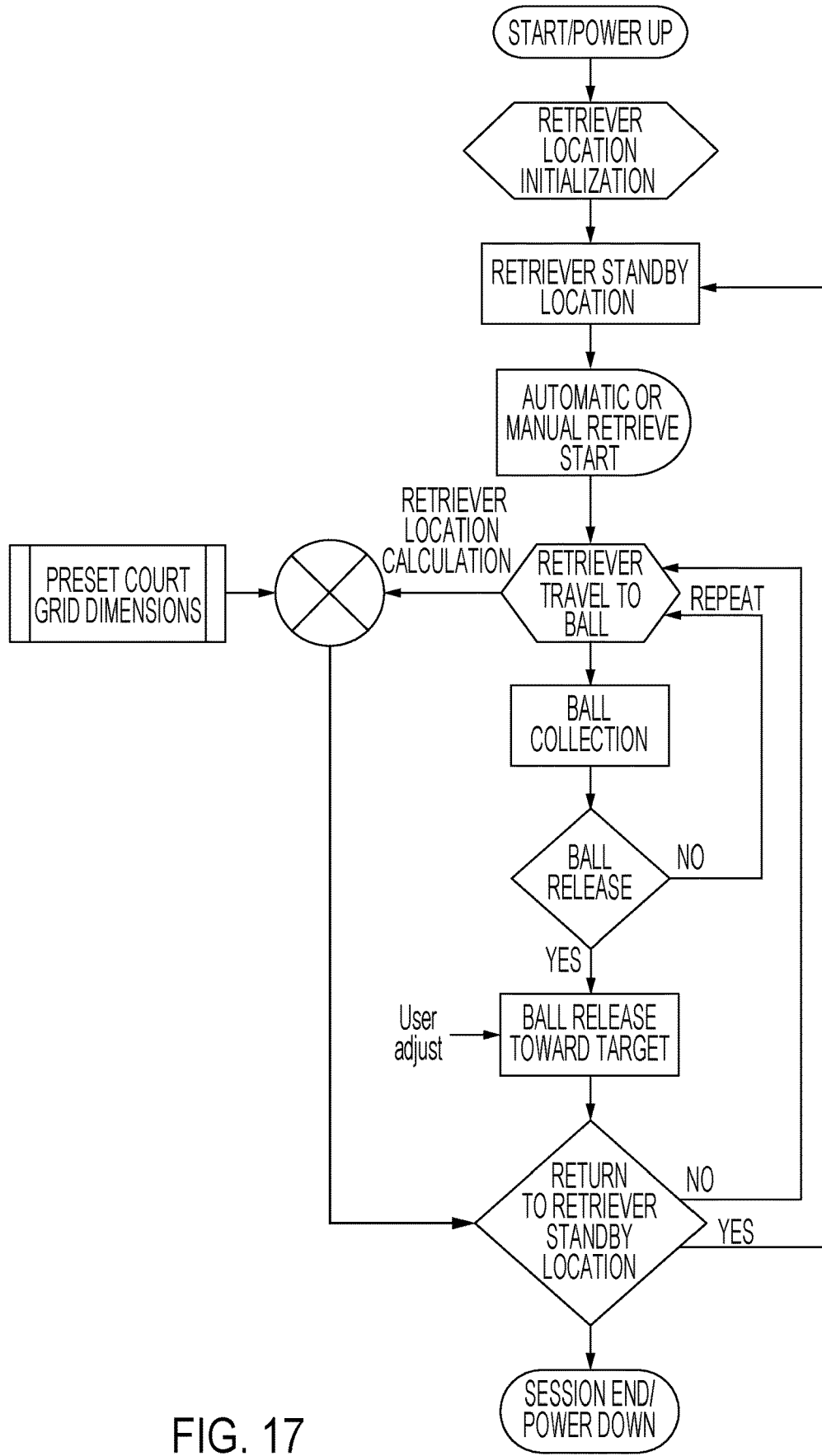
FIG. 17 is a logic flow diagram according to the invention.

FIG. 17 is a logic flow diagram exemplifying sequences for carrying out various embodiments of the invention. The diagram is self-explanatory in that it incorporates much of the logic, process, and programming described above to consolidate and convey the utility, novelty, and uniqueness of the invention in its multifaceted, numerous embodiments. It is further noted that the subroutine "Preset Court Grid Dimensions" includes as possible programmed (and, of course, user-modifiable parameters) the different racket sports' courts dimensions enumerated herein, as well as the options for indoor versus outdoor layouts and configurations, differing sizes (e.g. on larger or smaller areas behind baselines), and off-court (i.e. off the actual court in play) desired retrieval expansions, e.g. when adjacent courts are vacant and retrievals are expandable. A voice command protocol may include commands differentiating between a retrieval off-court immediately adjacent to the court of play, other adjacent or distant courts (e.g. using a command "multi-court" or similar), as well as fence retrievals called out as such, as further discussed below. Much of the logic illustrated in the figure is programmable into processor-controller 21 as discussed above. Variations are also within the scope of the invention as discussed elsewhere herein; e.g. the "Retriever Location Calculation" preferably includes applying a correction factor as necessary not just for computing a return path to the standby location but also for computing the retriever path to the ball release point or for further ball retrievals.

System 10 can accordingly include grid selection options and programming for player(s)/operators extending the collection grid on adjacent courts or spaces, with optional indicator lights 48 and 69 configured to display the status (e.g. "on-court" vs "extended"). If desired, another proximity sensor 42 can be mounted on net post 40 for sensing player activity in the extended grid areas for reasons of player safety to then automatically limit the range of retriever 12 (and where the adjusted status can be indicated as such).

Of course, there are sources of error inherent in some facets of system 10 that could degrade system performance, and the "Retriever Location Calculation". Retriever 12 during a retrieval may be commanded to traverse a number of course headings and distances, with multiple location calculations and thus a larger cumulative error. Processor-controller 21 can include standard path error correction algorithms (least squares, smoothing, and the like), while system 10 can include return path programming that directs retriever 12 (preferably in reverse as noted above) toward the sideline on the intended docking post 40 location, and the path toward the sideline can be error-corrected until the docking handshake is established between retriever 12 and docking station 64. Another docking routine described below utilizes a sensor array 810 on the back end of retriever 12 responsive to a homing or other linking signal emitted from or bounced off of docking station 64.

A useful retriever location calculation correction technique utilizes optically—(or other sensor—) readable fiducial markings such as court lines for updating the probable retriever location relative to the programmed court grid layout. One such technique calculates the angle at which retriever 12 crosses a line and compares the actual angle to a predicted angle based on the original path, and updates accordingly. A single-sensor technique is described in "Robot Odometry Correction Using Grid Lines on the Floor", P. Machler, Swiss Federal Institute of Technology, Lausanne, Switzerland, MCPA 1997 Pisa, Italy (hereinafter "Machler"). Machler describes a robot mounted with a single, downward-oriented light sensor capable of identifying a painted line on a floor surface, determining the angle of the robot crossing the line, and applying a correction factor to the odometry based on the angle calculation. The present invention includes this technique, as well as the computationally-simpler technique of positioning a sensor mutually adjacent on each side of retriever 12 and, based on the time differential between the sensors in sensing a line, calculating the retriever angle to the line to determine the angle and then the location correction factor. The light sensor provides an ideal short pulse when crossing a grid line that is used to synchronize the supposed position of the robot (calculated by odometry) with the real position.

Another probable retriever location computation technique relies on the microprocessor's internal clock in coordination with precision speed control and programmed-in path travel to guide retriever 12 from its standby location to a specific grid row or other designated path location. The programming includes retriever steering commands based on the time-speed-orientation computation(s), with travel commencing along and turns in accordance with the command path. Programming in standard initial retrieval paths to follow to specific locations as directed there by the operator voice command (estimated grid ball location as discussed above) along with operator retriever steering command adjustments (e.g. via voice command ("right", "left"), manual control, WII-type device, and so forth), coordinated with specified sensor inputs, is a useful, non-GPS-based local navigation system. The calculations are also useful for directing the ball release direction/velocity vector and release location, as well as the return to standby path routine. An exemplary return path is dictated by reading the magnetometer (orientation of retriever), reorienting to a desired initial return path orientation, and then reading the traversal of court features/fiducials such as the court lines to compute the desired return path. Once docked, it may be preferable to forego rotating plate 102 to its neutral, unrotated standby position and instead await the next retrieval, which may be on the same court side, in order to conserve power if a factor and extend the retriever's availability during a match.

Figure 18:
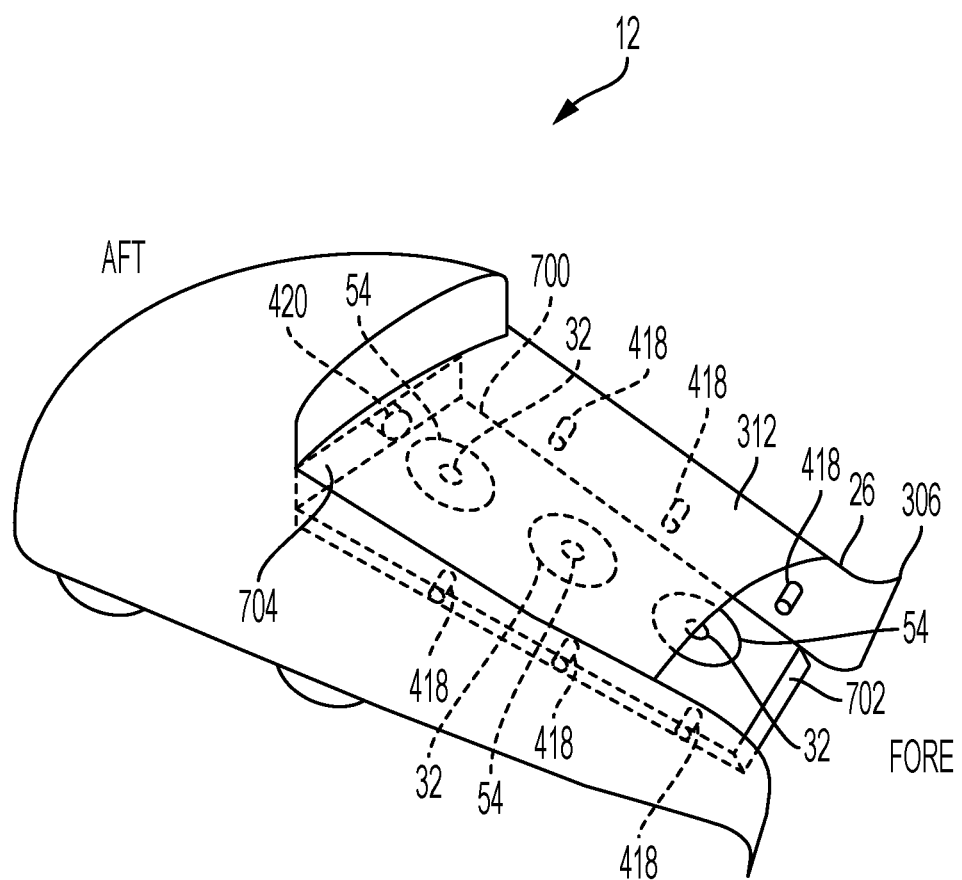
FIG. 18 is a top elevation view of a retriever with details shown in phantom according to the invention.

FIG. 18 illustrates another embodiment of the invention capable of releasably securing multiple balls, employing a ball tray 700, optionally including a slanted-down leading lip 702, positioned between or integral with the bottom portions of blades 26 and extending fore-to-aft as shown and so as to allow sufficient ground clearance for the front ball collection end when weighted down by the collected balls and the assembly itself. Tray 700 includes multiple spaced-apart ball support surfaces 54, as shown for up to three balls, that being the typical number in play for most recreational and competitive matches. A ball proximity sensor 32 is positioned to sense each collected ball, e.g. within or under ball support surface 54 as discussed above or mounted thereabove on the underside of roof 312 (see FIG. 14). Active detent means 418 (a solenoid-operated detent as shown) is positioned fore of each surface 54 for releasably securing a ball until release. Wall 704 just aft of the rearmost ball support surface 54 for securing a ball thereon may further include a ball ejector 512 (see FIG. 14) for strike-ejecting the ball(s) at the programmed release point. Sensors 32 and detent means 418 can be actuated in cooperation with user-input commands directing a retrieval for a designated number of balls. For example, for a one-ball retrieval, the intermediately-positioned detent means 418 can be actuated to serve as a backstop, and when the foremost sensor 32 is triggered, the foremost detent means 418 is actuated to trap the one ball until release. The process works similarly for the two and three ball retrievals. Release can then be conducted in a controlled manner toward the target. For example, with three balls collected, retriever 12 accelerates to a first release point where the foremost detent means are retracted, retriever 12 decelerates, and the first ball rolls toward the target. After a programmed interval, retriever 12 accelerates again to a second release point, and so forth. The processor programming can include instructions that upon execution sequentially release consecutive balls in this manner, so as to space apart each ground release and roll each ball toward the target with sufficient velocity to allow a player sufficient time to receive and collect each retrieved ball. The programming may thus encompass the desired intervals and retriever 12 acceleration, deceleration, and speeds determined by the release locations' distances from the target, to a programmed final release velocity for each release and then the deceleration or full stop to impart sufficient inertial velocity to the ball to release from the tray and roll to the target.

Figure 19:
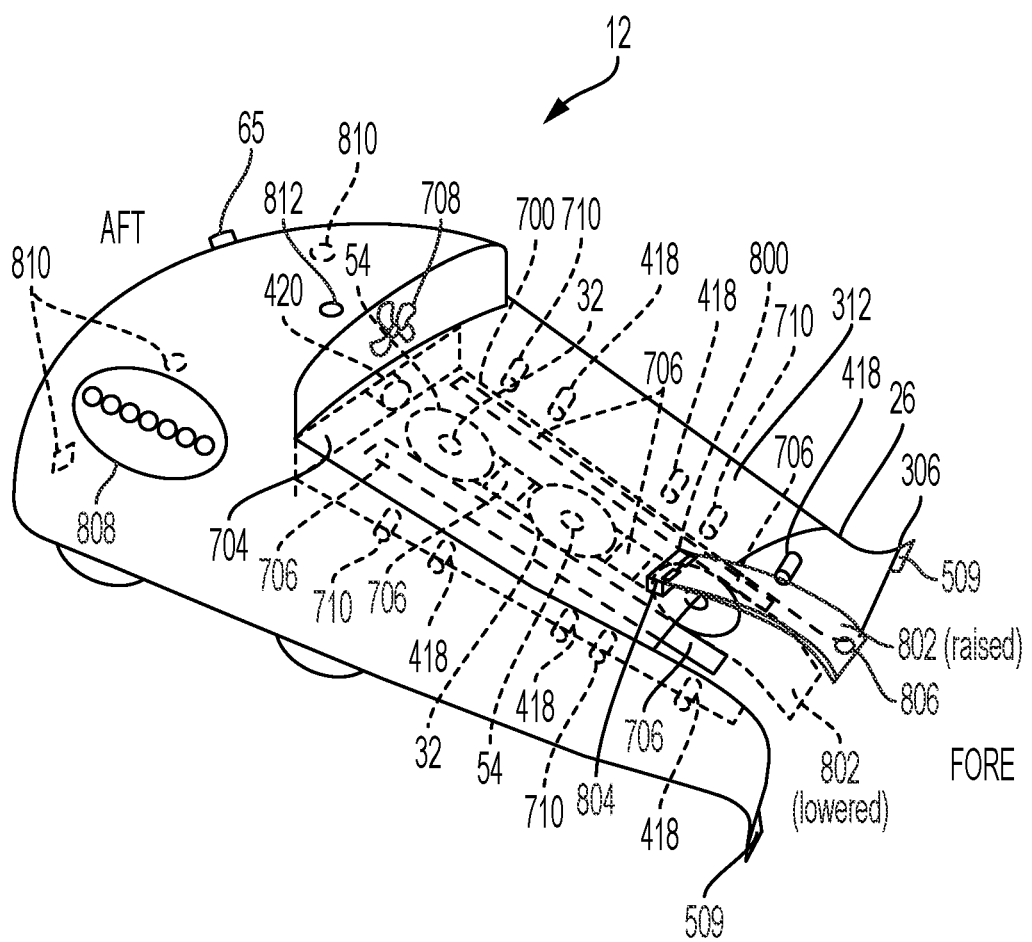
FIG. 19 is a top elevation view of a retriever with details shown in phantom according to the invention.

Referring now to FIG. 19, tray 700 may include through holes or slots 706 for allowing court debris or soft court surface materials to settle back on to the court and clear tray 700 of accumulation, particularly for clay court operation. Retriever 12 may further include means 708 for clearing tray 700 of court surface debris, e.g. a blower-fan unit or forced air jets positioned behind and/or alongside tray 700 as illustrated (or, brushes or other mechanical removal means or the like). Soft courts with raised court lines/nails and hard courts having cracks or uneven repairs present less-than-ideal operating environments, therefore, retriever 12 may further include a means 710 for raising tray 700 to surmount the surface irregularities and thus minimize retrieval disruptions. As illustrated, means 710 comprises one or more opposing slot pairs, where the forward-positioned opposing slots include a curved portion permitting tray 700 to lift up and back when encountering a raised court area and with tray 700 in the unlocked position. The underside of tray 700 may further include one or more skids (not illustrated) to prevent tray 700 from catching on raised lines/nails by bumping tray 700 upwards. Tray 700 can also be locked at the front slot pair if desired when running on a smooth court surface.

In lieu of placing corner deflectors (described above) to eliminate hard-to-retrieve corner fencing-lodged balls or to facilitate other difficult retrieves, retriever 12 may include a means 800 (see FIG. 19) for grasping and securing a ball for otherwise difficult-to-retrieve balls, e.g. in or near a corner, up against perimeter fencing, obstructions (e.g. an equipment bag, a chair support, or the like), or other tight spaces. Means 800 as illustrated comprises an arm 802, e.g. an elongated curved member, half-robotic claw, or the like, pivotally mounted above collection space 30 and between the tips of blades 26, and also a means 804 for moving arm 802, e.g. a stepper motor, solenoid-piston, or the like, from a raised, nondeployed position to a lowered, ball-grasping-securing deployed position as indicated in phantom. Means 800 may be activated and retracted in coordination with one or more proximity sensors 806 positioned on blades 26 or elsewhere on retriever 12 (e.g. at/on its fore end, e.g. on the leading edge of arm 802 as shown, to the side on the leading edge, or on top of roof 312), whereby upon detecting proximity to the fence or obstruction, sensor(s) 806 outputs a signal/indication to an input of processor 21 that in response executes programmed instructions directing means 804 to move arm 802 into position to grasp and secure a ball. Subsequently upon other processor inputs described herein signaling a completed collection, processor 31 directs means 804 to move arm 802 back to its raised, standby position.

In a basic configuration with blades 26 fixed (that is, not retractable), and with arm 802 positioned to make contact with a ball, the ball is accessible even with retriever 12 up against an obstruction or corner fence portion. In the latter case, retriever 12 can approach the ball alongside a run of fencing rather than at an angle directly toward the corner which could interfere with arm 802 grasping the ball due to fencing interfering with blades 26. For these retrievals, the means for determining retriever position/location can interface with the programmed-in court grid/dimensions and side-clearance object proximity sensors to compute when to activate means 800.

A more direct, "heads on" corner ball retrieve, i.e. with retriever 26 approaching the corner ball along the corner diagonal, is feasible with retractable blades 26, although this obviously adds complexity to the overall design. Another approach to this retrieve is to utilize a protruding (or retractable/extendible) arm 802 that extends sufficiently forward of blade ends 306 to contact and grasp the ball despite fence contact with blade ends 306. Means 800 can be activated either manually or by a programmed-in voice command, e.g. "fence", "corner", or the like. The retrieve path protocol can include retriever 12 upon securing the ball automatically reversing from the corner/obstruction, with arm 802 lifting only upon the ball being secured for later release.

Referring again to FIG. 19, retriever 12 in addition to (or in lieu of) indicators 48 or 65 may include a message screen or indicator array 808 on each side to display an indication of the information to the operator, such as the present status of a retrieval in traversing a commanded course. The readout in this instance could comprise a status bar increasing (or if desired the reverse) in length to enable the operator to gauge the retrieval progress and adjust it as needed with further voice commands or other input.

The embodiments of the invention discussed above apply mainly to recreational play rather than professional or other tournament-format settings that utilize ball-persons for loose ball retrievals. The invention is also useful for the latter where it can speed up and expedite play, an issue of increasing importance. USTA rules now require players to adhere to specified time restrictions and tournaments provide clocks to alert them to the countdowns. The clock is turned off during points, but it rarely rests when the ball is not in play. The countdown starts the moment players walk on court, counting down the one minute they are allowed between arriving at their chairs and attending the pre-match coin toss. The clock then counts down five minutes for the warm-up, and one minute again between the end of the warm-up and the start of the match. Players are given 25 seconds to start their first serve, and between games, it counts down from 30 seconds; during changeovers, it counts down 1 minute 30 seconds; and between sets, two minutes. It also displays the three minutes allotted for medical timeouts. The first time the clock hits zero before a player begins the service motion, the player receives a warning. For every subsequent time it happens, the player loses a first serve. The returner is instructed to play at the pace set by the server. Speed of play therefore has literally become "of the essence". Pro tournaments also generally utilize thrown and rolled ball techniques during retrievals.

Retriever 12 may therefore include both capabilities, operationally selectable by either the operator (umpire, ball-person, or player) or by system 10. Accordingly, ejector 52 and ball queuer/feeder 406 can cooperate as a two-way feed path (shown by the double-headed arrow in FIG. 14). Roof 312 preferably has a fore-to-aft decline (negative slope) for directing bouncing balls into aft collection space 510. Ball ejector 52 may include an adjustable force capability that permits the operator or system to engage in 2-way ball feed either toward or out of the ejector and toward the front for inertial ground release, or alternatively, an additional ball ejector 512 (e.g. a solenoid-piston type) positioned orthogonal to ejector 52 can provide this dual capability to eject a ball either up or forward. A second concave ball channel 514 on the aft forward-facing upper housing 15 may be included to funnel balls into aft collection space 510 through the opening behind (aft of) roof 312. The forward-positioned ball proximity sensor 32 can be positioned on the underside of roof 312 in lieu of on a blade 26. Retriever 12 in this configuration may further accommodate up to 6 balls or more (e.g. for tournaments or other situations utilizing same) by the appropriate sizing and relative placement of these ball-feed components, and can optionally include an additional feed bin (not illustrated) connected to same.

It was noted above that an advantage of the invention is in professional tournaments that use ball-persons for retrievals. Given the present SARS-Covi-2 ("Covid-19") pandemic and the transmissibility of viruses via contact with surfaces, the less handling of the ball, the safer it is for the participants. System 10 or retriever 12 optionally includes a germ-killing ultraviolet module such as that described in U.S. Pat. No. 9,212,067, "Water Bottle with Flow Meter", Gellibolian et al., issued Dec. 15, 2015 and incorporated herein by reference. The uv module can be positioned in a ball feed chamber or other suitable ball receptacle, and include an interior surface coated with a reflective material to optimize the uv energy generated by the uv light emitting diodes (LED) hitting the ball surface, as described in Gellibolian et al.

Professionals in tennis tournaments as well as other tennis players have differing preferences concerning selecting which ball to put into play. For example, system 10 can be programmed to respond to the operator or players' selected preferences or respond via voice command or remote control to provide a ball or balls on command. A player can then choose to have retriever 12 provide a varied combinations of retrieval preferences, whether it's a mode of ball release—rolling or bouncing the ball (e.g. to be caught on the racket face) or launching (to be caught by hand), or a combination of these, as well as including the option to reject a ball before serving and signal for another, and so forth. The invention can further include player-selected options such as the ball release timing interval, ball release velocity, trajectory and the like for rolling or ejection releases. The fiducials or alternative ball-queuing-targeting means discussed herein can facilitate and help enable this capability. Fiducials may also be employed in other aspects of the invention. For example, a fiducial can be assigned to the docking station and/or net post, and programmed to interface into the docking, redocking, and other functionalities incorporated into system 10 involving the docking station.

Another version (not illustrated) utilizes a compressed gas (pneumatic) system to apply the motive force to the ball to eject via the chute or a ground-release; it may also be configured to work from a single pressure source using check valves or the like to direct the motive force for the desired ejection type.

System 10 may further include programming instructions that upon execution cause ball ejector 52 in combination with a vectoring of retriever 12 to direct balls by ejection and/or rolling in a desired direction and at a desired velocity, for example toward players in a match sans ball-persons, or in other scenarios, e.g. in a high level tournament setting, where system 10 cooperates with tracked or set locations of ball-persons or players, and optionally also with a ball-tracking system such as described above, with retriever 12 being directed to return a ball in accordance therewith.

The retriever system processor in combination with the ball tracker preferably includes a ball intercept algorithm the instructions of which upon execution compute an optimized retriever-ball intercept time, location, and/or path and direct the retriever with respect to speed and angle of approach to optimally intercept and collect a bouncing ball. The retriever system preferably includes an abort routine as discussed above and may further comprise override capabilities under the control of the operator remotes for directing the release of the ball(s) in an optimized direction and to an optimized location. For example, instead of rolling the ball(s) back toward the initiating remote/operator, by means of an override the ball(s) may be released toward an alternate operator and/or location on the court, such as toward the baseline areas. Further control may be assumed, e.g. for player safety purposes, to release the ball(s) as commanded by a remote in the direction of that remote. This would allow a ball-person to direct balls away from a player's path.

Professional tournaments utilizing ball-persons by also utilizing the retriever can optimize the combination by decreasing the number of required ball-persons. For example, tournaments often position two ball-persons at the back of each court side as well as at least one and usually two near the net, one by each net post. One or both ball-persons by the net posts can be replaced by one or more retrievers that can retrieve balls in or near those areas and then return the balls in the direction of the ball-persons behind the baselines. For example, even replacing just one ball-person by the net posts decreases the staffing requirements and facilitates that ball-person's job in retrieving net balls toward the other sideline. Of course, the alternating of serves from one court side and to the other more often than not results in "lets" (balls hitting the top of the net and dribbling over), leading to retrieval and match delays minimized by substituting the retriever for net-caused or net-side retrievals. Accordingly, employing the retriever not only speeds up play but also decreases the distraction to the players since the retriever is smaller and less visible (for example as the players are reassuming their service and receiver statuses and ball-persons are not in their direct or peripheral lines of view).

The retriever system enables a ball-person by a net post (or absent them behind the baseline(s)) by means of a player/operator remote to control retrievals as needed. Accordingly, one or more retrievers can be positioned outside the net posts or at other positions around the tennis court to optimize the retrievals. If a retrieval is commenced but the ball travels in an unpredicted direction, e.g. landing on the opposite side of the court from a commenced retrieval, the system particularly in the pro configuration preferably includes programed instructions that upon execution respond to an operator's remote control signal or voice command to abort a retrieval and/or actuate a retrieval by an alternate second retriever. This command is also useful should the retriever for whatever reason go toward the wrong court, and the 'abort' command or the like can be followed by another command redirecting the retriever. The retriever system of the invention may also be used with commercially-available ball tracking systems/algorithms, such as the HawkEye® ball tracker or others that have both location and 3-D tracking capabilities to thereby provide 3-D data for retrieving a bouncing ball. The data is processed as described with the retriever controlled and directed as described.

Accordingly, system 10 in another embodiment expedites play by employing one or more retrievers 12 in conjunction with one or more remote control devices selectively controlled by one or more ball-persons to assist in retrievals. System 12 preferably includes programmed instructions that upon execution calculate an optimized retriever-assisted retrievals of loose balls (e.g. based on parameters such as the ball location relative to the locations of the remote control devices/ball-persons), thereby selecting the retriever 12 providing the optimal retrieval efficiency for retrieval and release/return over other retrievers or over a manual retrieval option. Possible standby locations for retrievers 12 can be selected based on the overall court dimensions including off-court areas, and where the chair ump, ball-persons and line judges are normally positioned, and so as not to present a safety hazard to the players and other participants. One safe, central location is under the chair umpire's chair.

Referring again to FIG. 19, retriever 12 optionally includes a sensor array 810 preferably positioned on its aft housing responsive to a homing signal such as an optical beam or RF signal emitted from docking station 64, e.g. from T/R 69 or a separate dedicated signal emitter. The docking maneuver is accomplished by adjusting steering commands as necessary to align array 810 with the emitted signal and thus adjust the orientation of retriever 12 as it approaches station 64 to ensure a successful docking.

The docking station embodiments described and shown herein are illustrative in that other designs not illustrated are considered within the scope of the invention. For example, the turntable-type configuration described above with means 106 rotating plate 102 can comprise an array of selectively-activated electromagnets that in cooperation with a corresponding array positioned on the rear housing of retriever 12 can position the retriever and/or turntable to a programmed or selected position. Another docking system (not illustrated) utilizes court-installed fittings configured to receive corresponding retriever 12 couplings which may include hard-wired charging means and other components described herein. One location is in the area adjacent a net post, and under an umpire's chair or its vicinity so as not to present a further obstacle to players during match play.

Other embodiments are also within the scope of the present invention and it is not limited thereby. For example, retriever 12 for steering means 20 may employ a swerve/crab configuration, where wheels modules rotate on the vertical axis to control direction, and which typically employs 4 traction wheels, with a representative range of retriever speed of about 8-12 ft./s. Omni-directional retrievers have good maneuverability and efficiency at the expense of some extra complexity. Suitable drive motor(s) 16 may comprise 3 or more motorizing wheels (e.g. Mecanum wheels) to provide independent tangential, normal and angular velocities. Three wheeled systems are mechanically simpler, but four wheels provides better acceleration using the same motors along with improved traction, such as described in is "Dynamical Models for Omni-directional Robots with 3 and 4 Wheels", https://www.researchgate.net/publication/256089847_Dynamical_Models_for_Omni-directional_Robots_with_3_and_4_Wheels. "Fast and Precise Positioning of Wheeled Omni-directional Robot with Input Delay using Model-based Predictive Control", M. Zarghami et al., IEEE Proceedings of the 33rd Chinese Control Conference, ISBN: 978-9-8815-6387-3 (28-30 Jul. 2014), describing the trajectory tracking of an omni-directional mobile robot by model predictive control ("MPC") in the presence of input-delay, where the MPC controller is employed to the end of trajectory to achieve a significant reduction in the time of robot travel. According to the authors, the approach achieves about a 40 percent enhancement over a PID controller in time to reach target and results in improved robot control in target point error.

Omni directional robots are built using omni wheels and/or castors. Since Omni wheels have smaller wheels attached perpendicular to the circumference of another bigger wheel, they allow wheels to move in any direction instantly. The major advantage is that they do not need to rotate or turn to move in any direction unlike other designs. In other words, they are Holonomic robots and can move in any direction without changing the orientation.

Example 1

A retriever 12 was built by modifying an off-the-shelf Simrex A130 ¹⁄₁₆ scale 2-wheel drive RC remote control off-road truck, with a ball collector 24 mounted thereon including opposing blades 26. The retriever was tested on a hard-court surface, successfully collecting balls at the net as well as in areas away from the net and releasing the balls toward the center service-mark on the baseline. A number of different blade configurations were thus tested in order to define and refine blade parameters such as length, contours, optimal sensor placements, and passive detent configuration and the like, to finalize the design parameters for the 3D-printed prototype blades ("test blades").

The test blades 26 were fabricated as mirror-image structures of one another using an AutoCAD-programmed 3D-printing process employing acrylonitrile butadiene styrene (ABS) polymer, to the following specifications:

| Description/Drawing Ref. Num. | Description ("L" = length, "W" = width, "D" = depth) |
|---|---|
| Detent 50 | Concave middle section: 7" L (at top); 2⅞" W (from bottom ⅛" ball guide); 1½" $D_{max}$" at top center |
| Blade 26 | Blade: 16" L; 3" W; ⅛" D |
| Blade end 306 | Blade flare : 26° angle from blade ball guide (310); 3" L; 2" $W_{min}$ (at leading fore edge) |

For testing, blades 26 were spaced apart 3"-4", secured aft to a robot platform, and by a pair of spars above the collection space with the fore spar just aft the blade flares and the aft spar just aft of damping areas 50. The fore spar emulated a leading edge of a roof 312 to test its functionality for redirecting and containing a ball deflected aft and bouncing off the flares in high speed ball retrievals. Previously, testing had confirmed the equivalence between a moving retriever ball retrieval and stationary retriever tests (where balls of a known velocity (ramp-accelerated) were directed against the blades), the latter while video-recording from just above the blades to study the collection dynamics frame-by-frame, as follows.

Example 2

The operating characteristics of the test blades were first studied by securing the blades in a) a stationary, fixed position and b) a rotatable position, and directing tennis balls at and into the test blades at varying angles and varying ball velocities, while video-recording the tests and studying the test blade performance frame-by-frame. Balls were fed through a 3" ID 10' length PVC pipe fitted within a 4" ID 10' length PVC pipe to provide both flexibility in varying ball velocity and to permit balls (≈2.7" diameter) to freely exit the angled 4" pipe opening. The pipes were set at differing heights at the feed end to produce varying ball exit velocities, from 3 ft/s to 10 ft/s.

(a) Stationary tests: tennis balls at higher velocities were captured effectively notwithstanding some bouncing off the fore spar. Lower velocity retrievals were routine.

(b) Rotating tests: the retriever was rotated upon a ball rolling past the fore sensor 32 slots at both higher and lower speeds, and the balls stayed in the collection space 30 and were observed to utilize both blade passive detents 50 (concave areas) that functioned as damping means in retaining the balls.

The dimensions of retriever 12's ball collector 24 are based on the official tennis ball dimensions established by the International Tennis Federation: diameter 6.54-6.86 cm (2.57-2.70 inches), and a mass of 56.0-59.4 g (1.98-2.10 ounces). Accordingly, ball collection space 30 for tennis must have a minimum width of at least 2.70 inches fore-to-aft back to or near wall 28), and for the other court sports discussed be spaced sufficiently for the size ball. Flared portions 306 are shaped as shown to minimize snagging on the tennis net (1¾" square openings) and the center tie-down strap.

Collector blades 26 may be of a modular design, to increase or decrease overall length, or alternatively be extendible/retractable. Accordingly, when extending the blades, one or more additional ball collection sensors may be installed on blade modules/sections for different multi-ball modes.

Example 3

A prototype retriever 12 that incorporated elements illustrated in FIGS. 9-11 and 18 (the blades and the ball tray with a single ball support and without active detents) was constructed on a Traxxas Model 83024-4 4TEC2.0 AWD chassis. The drive system was a Titan Model. No. 12T550 brushed motor consisting of a high speed 12 turn design and integrated cooling fan, with an integrated cooling fan and a 3 mm output shaft powering the drive train via a pinion gear and spur gear-driven shaft connected to both front and rear axles to provide all-wheel drive, controlled by a servo control, and powered by a LiPo 5000 MAh battery (amp draw rating, at 7.2V=3.2 amps max). Ball retrievals were conducted for one, two, and three balls at differing locations on a flat surface approximating the size and configuration of one side of a tennis court dimension (note—testing was conducted during the Covid-19 pandemic lockdown with tennis facilities closed). The tray and lower blade clearance to ground was ⅛"-¼" with the ball tray's leading lip having about a 1/16"-⅛" ground clearance. The tray was fabricated from 1/16" thick aluminum sheet stock and integral with 3" spaced apart walls for mounting the blades to create a 3" wide ball collection space. Balls were successfully retrieved from several spaced-apart locations and then inertially ground-released toward a target via decelerating/stopping the retriever. It was observed that employing manual control throughout a multi-ball retrieval necessitated some training time and acquired skill, particularly to be able to control the speed of the retriever during turns in order to avoid premature release of balls from the collection space between the blades prior to reaching the release point. This problem readily resolved by (i) programming the retriever system to hand off manual control to automatic system control upon one or more ball proximity sensors sensing ball capture, and/or (ii) including one or more pairs of active detent means (e.g. solenoid-actuated pistons or buttons, a robotic claw, and so forth).

Example 4

The retriever in Example 3 was run during singles match conditions employing a grid pattern as described above. Retrievals were conducted in the on-court and off-court areas designated by rows labelled as "net", "1-3", and "line" for the service court areas with "mirror image" rows as described for back court retrievals, and the off-court areas also as described above. The voice commands further included commands to "slow", to turn ("left" or "right"), and then "good" to stay on heading. Retrievals were also conducted on adjacent unused courts using this system. The system worked well in regard to the voice command structure and the operator estimating the balls' locations and making adjustments on the ball approach using the appropriate adjustment commands. A minimal number of retrievals were aborted.

Various ball tracking patents and systems directed to tennis match ball-tracking may be utilized in the invention, e.g. as described in U.S. Pat. No. 7,203,693 or as implemented in the HawkEye® system. Video stream ball-tracking data can be tapped into and accessed by system 10 for accessing ball location and dynamics for retrieval purposes, which data may be accessed a priori to final [line call] processing. The latter may require a higher degree of precision (e.g. ball in-ball out line determinations) than that required to direct the retriever for a retrieval operation. Retriever 12 may include noise-reduction technology to minimize the noise effects and potential for player distraction or include a [user-selectable] sound generator for generating a less offensive, masking sound. Orientation means 17 upon startup/initialization locks in an initial court position orientation, preferably via an operator positioning the retriever alongside a net post in its standby position, initializing that position as input into processor-controller 21 that includes instructions which upon execution apply that standby position into ball retrieval computations so as to accurately direct (and factor into tracking) the movements of retriever 12 in commencing a retrieval and for guiding retriever 12 back into a suitable standby position and orientation.

An exemplary 3-axis MEMs magnetometer is the LIS3MDL model from ST (available from Pololu in a carrier with voltage regulator for 5 V power applications with an I²C clock and data line 5 V interfacing capabilities (Model no. 2727)). The three magnetic field strength readings (as noted, it should suffice to use just two taps for a planar surface application as here) are available through a digital interface which can be configured to operate in either I²C (TWI) mode or SFI mode, although since retriever 12 will be positioned on and moving around a planar court surface, the 'x' and 'y' outputs should suffice for most purposes as inputs into processor-controller 21.

The housing 12 should be selected from materials that do not interfere with the accuracy and operability of orientation means 17; when employing a magnetic field-based device such as a magnetometer, suitable housing 12 and securing means 14 materials should be non-ferromagnetic, e.g. plastics or polymers.

Professional tournaments utilizing ball-persons by also utilizing the retriever can optimize the combination by decreasing the number of required ball-persons. For example, tournaments often position two ball-persons at the back of each court side as well as at least one and usually two near the net, one by each net post. One or both ball-persons by the net posts can be replaced by one or more retrievers that can retrieve balls in or near those areas and then return the balls in the direction of the ball-persons behind the baselines. For example, even replacing just one ball-person by the net posts decreases the staffing requirements and facilitates that ball-person's job in retrieving net balls toward the other sideline. Of course, the alternating of serves from one court side and to the other more often than not results in "lets" (balls hitting the top of the net and dribbling over), leading to retrieval and match delays minimized by substituting the retriever for net-caused or net-side retrievals. Accordingly, employing the retriever not only speeds up play but also decreases the distraction to the players since the retriever is smaller and less visible (for example as the players are reassuming their service and receiver statuses and ball-persons are not in their direct or peripheral lines of view). As discussed above, optional LEDs 29 (e.g. the model CX013 dot red line laser diode module with adjustable laser shape, 3 v, 5 mw, 650 nm, mfr. by Changxing) on retriever 12 project ahead via visible light lines of retriever 12's ball-collecting path or "swath" to indicate an accurate heading toward a ball to aid in manually-directed retrievals by facilitating manual course-heading adjustments.

For a system 10 configured for 2-player use, processor-controller 21 can include a routine to track/allocate for each remote/player an allotment (like a chess match clock) to allocate their respective retrieval allowances. This encourages judicious deployment and encourages conserving retriever power until later in a match when retrievals are more critical. Status can be provided via a smart phone app. This can also promote player safety, in that having the retriever respond to the side of the court called from necessitates that a player is alerted to the retriever moving on that side of the court—a beeper and/or flashing light on housing 15 can also promote safety. Accordingly, indicator 48 or 65 as discussed above may comprise an audible alarm (e.g. a beeper) to alert nearby players to the movement of retriever 12. In order to enhance system safety reliability, a microphone 812 or other suitable acoustic sensor is preferably included to check the functioning of alarm indicator 48 or 65, similar to that used in the second generation Google Nest Protect which offers a built-in microphone to self-check its speaker and horn by means of the speaker and horn emitting a short test sound, with the microphone monitoring the expected sound. In the case of Google Nest, if the microphone cannot confirm operability, an indicator is activated. The invention accordingly preferably includes this safety protocol and additionally is configured to output a stop or aborting-return to standby signal to cease the retrieve in progress. The audible warning system may be configured to activate selectively for off-court retrievals or retrievals outside a programmed or user-selected retrieval zone(s). These safety protocols of course can be interfaced and coordinated with the proximity detector 42 or 509 to further provide for court safety during retriever ops.

System 10 can further include fence-mounted sensors for mounting on the fences behind the players to alert a player to the presence of a ball rolling toward the player from behind and which can further include an audible alarm. This relates to the safety aspects referred to that the invention provides not just for balls in the playing area but also behind the player.

As noted above, processor-controller 21 includes a programmable module and microcontroller for receiving and processing input signals and for generating output signals for controlling retriever 12 and components. In addition to the input signals and output signals already noted, available (in some instances dependent on the particular embodiment/configuration of system 10) inputs include input signals from retriever orientation sensor means 17, retriever location determining means 19, sensors 32, 33, 42, and 509, T/R 43, commands from T/R 44 (e.g. ball location coordinates), control signals from remote T/R 62, and T/R 69; processor-controller 21 outputs include but are not limited to control signal outputs to retriever steering means 20, indicator 48, (active) detents 50, ball ejectors 52 (and solenoid 400), 420 and 512, and means 600 for rotating ball support 54. Processor-controller 21 is programmed to process the input signals and output the corresponding control signals as is described herein and otherwise in accordance with programming known to one of ordinary skill in the art.

It should therefore be understood that the description and embodiments described and claimed herein should not be limited thereto. Accordingly, the invention may include additional variations within the knowledge and capability of one of ordinary skill in the relevant art. For example, alternatives to the solenoid-piston type impeller ball-striking mechanisms described above include other impeller-drive devices, such as in US Serial No. 20110303208A1, published Dec. 15, 2011 (G. Taylor) and incorporated herein by reference, where the impeller assembly may include (a) a gear-driven rotating member employing a coupling mechanism that includes reliant biasing means mechanically attached to the impeller assembly, or (b) a rack and pinion system with the pinion rotationally coupled to the impeller assembly. Given the desire to provide a compact or low-profile retriever in the present invention, solenoidal mechanisms generally provide the better alternative.

As mentioned above, in order to optimize retriever 12's performance time characteristics, it may be desirable to utilize multiple retrievers, e.g. two retrievers per court, one dedicated to each court side and positioned accordingly, in the direction of its designated side at standby. Alternatively, retriever 12 has a turret rotatably mounted on chassis 14, thereby allowing retriever 12 to move toward either court side quickly without rotating chassis 14, and where the turret can be rotated into position even as retriever 12 is moving or starting to move in the direction of the retrieval, optimizing retrieval time. US Patent Application No. 20100155156A1, R. Finkelstein, Jun. 24, 2010, and US Patent Application No. 20170153091A1, K. Diaz, Jun. 1, 2017, both incorporated herein by reference, describe top-mounted turrets that with minor modifications are within the scope of the invention.

Also as discussed, means 19 for determining the location of retriever 12 includes GPS-enabled receivers, and other means, e.g. wheel encoders positioned on one or more wheels with input(s) to processor-controller 21. For the latter, processor-controller 21 includes location calculation programming with instructions that upon execution compute a present location of retriever 12, as input into other processor-programmed modules such as the steering and docking control routines. Duplicate location determination means may be included should redundancy be desired for comparison or backup purposes, with an optional automatic or manual heading direction override.

Different court surfaces may dictate different functionalities and therefore different modifications to and versions of retriever 12. Well-groomed clay or HarTru®-type soft court surfaces may necessitate or suggest the use of wheel configurations having better traction while leaving minimal tracking than others—narrow wheels generally provide better traction but leave deeper tracks, therefore aft-mounted surface brushes (e.g. one behind each rear wheel) can smooth the tracks but increase drag. The retriever should preferably go forward and not traverse a path in reverse, which affects the path selection and its programming. Wider wheels or treads would slip or skid more, but leave wider, less pronounced tracks. Retractable brushes are advantageous to reduce drag, but add more complexity, and are practical only in conjunction with the requisite path programming to maximize the deployment effectiveness. Grass courts tend to "brake" or slow down a rolling ball more than other surfaces; also, the ball does not roll as well upon collection and encumbers the retriever, so full ground returns are not as desirable as securing a collected ball just above the grass court surface (e.g. by means of slightly raising lip 412 upon ball collection onto lip ball surface 413) until reaching the ball release location. Although a standard ground release may then suffice, employing an ejector 420 provides a higher release velocity which is desirable on grass.

Multi-ball collection can utilize lip 412 because collecting two or more balls and rolling them in contact with one another can lead to "turbulence" in the balls' rolling dynamics from the surface-to-surface frictional contact; hence, each ball's surface rolling can be impacted by the dynamics introduced into the system. Lip 412 helps to minimize this phenomenon by providing separation between the collected balls and elevating one or more balls above the court surface, eliminating the rolling dynamic and facilitating "non-turbulent" retrieval dynamics.

Global Navigation Satellite Systems (GNSS) enhancements to position accuracy include "dual-frequency" GNSS support. Dual-frequency GNSS means that the receiver tracks more than one radio signal from each satellite on different frequencies—for GPS, this is L1 and L5, and on Galileo E1 and E5a. Utilizing two GPS frequencies versus just one improves location determination accuracy (user range error ("URE")) by orders of magnitude (by correcting signal distortions caused by Earth's atmosphere), up to in some systems even a few centimeters location determination accuracy. Costs should come down and make this affordable even in the basic versions of the invention. Systems that enhance positional accuracy inter alia include DGPS (Differential GPS), AGPS (Assisted GPS), RTK (Real-Time Kinematic), and e-Dif (extended Differential). DGPS utilizes a base or reference station GPS receiver and a second roving GPS receiver, to improve accuracy to within a few meters or better. Advanced L5/E5a signals are less prone to multipath errors and therefore can be used to refine position accuracy to the order of 30 cm. Accordingly, dual-frequency GPS T/R's 43 and/or 44 (that is, one situated on retriever 12 and the other off-board, e.g. on the docking station 64 or the remote 60 utilizing a combination of workable protocols, handshakes and the like) can deliver the requisite accuracy over present one-frequency systems. It is also recognized that predictable and customary advances in the arts such as advances in GPS accuracy can contribute to system performance.

Retriever 12 can further include a towel holder or dispenser or the like (not illustrated) to enable a player to towel off as is provided by ball-persons at tournaments. A suitable protocol for enabling this as an option is having a remote control keying sequence or employing a voice command, such as "Towel" where the ball(s) are returned and then retriever 12 is queued to approach the player to utilize this feature.

It is again noted that the invention as described herein should be interpreted as not limited to the specific embodiments described but to include variations recognized as equivalents in the art(s). The invention thus includes in-process developments such as highly sensitive acoustic pickup devices (as discussed above) positioned on the retriever or docking station (e.g. on one or more of retriever 12 docking station 64s' T/R devices 43, 44, and 69) including sub-vocalization capabilities for controlling retriever 12 as discussed. The invention may also find use in other sports such as baseball that similarly employ ball-kids to retrieve loose balls. A player was injured recently when, while attempting to catch a ball in foul territory, he fell through an opening in the screening used for ball-kid access to the field. One or more retrievers 12 may be positioned at standby within a smaller field access opening, e.g. one built into an advertising panel inset into a wall alongside the stands, and controlled remotely as described herein, providing a safer ball retrieval system. System 10 can then further constitute a comprehensive ball handling and management system for collecting stray baseballs and depositing same into a receptacle adjacent to the docking station following each retrieval, optionally with sanitizing means such as an UV apparatus described herein. This also minimizes human contact with the ball, desirable in maintaining a sanitized environment, especially important during an epidemic such as the SARS-Covid-2 epidemic. Of course, ball-kids interact with baseball game attendees, often tossing them the ball as a game souvenir. The ball handling system can offer an alternative, e.g. by identifying an attendee in proximity to the retrieval and awarding the person that or another game ball (perhaps one autographed by the player who struck the ball).

What is claimed as new and desired to be protected by Letters Patent of the United States is:

1. A tennis ball retriever for retrieving a tennis ball on a tennis court and for controllably releasing the ball during a match between at least two players, said retriever having a fore end and an aft end, comprising a chassis;
at least one wheel mounted on said chassis;
a drive system coupled to said at least one wheel;
a means for steering the retriever;
a receiver for receiving retriever control signals;
a retriever processor-controller, having inputs for receiving control and data input signals and outputs for retriever command and control signals, said processor-controller being programmed with instructions that upon execution generate output signals based on the input signals for controlling the retriever;
an on-board power supply;
longitudinally-extending sidewalls spaced mutually apart to thereby define a ball collection space therebetween having a width sufficient to receive and release a ball and terminating in a fixed opening at the fore end of the retriever to allow unimpeded ball transit therethrough into and out of the ball collection space during ball retrievals;
an aft ball deflector for deflecting an airborne ball into the ball collection space; a vertical ball ejector positioned so as to vertically eject a ball from the collection space; and wherein the ball ejector includes an adjustable guide for directing a ball in a desired direction.

2. The retriever of claim 1, wherein the vertical ball ejector is situated aft in the ball collection space.

3. The retriever of claim 1, wherein the vertical ball ejector includes force adjustment for adjusting the vertical release speed of a ball.

4. The retriever of claim 1, further comprising a means for grasping and securing a ball.

5. The retriever of claim 1, further comprising outwardly-flared tips for deflecting a ball into the ball collection space.

6. The retriever of claim 1, further comprising a horizontal ball ejector positioned aft of the ball collection space for ejecting a ball therefrom in a horizontal direction along the court surface.

7. The retriever of claim 1, further comprising an orientation sensor, and wherein the processor-controller further includes a programmed-in tennis court grid map and programmed instructions that upon execution direct the retriever movements during ball collections and releases in accordance with the grid map utilizing orientation signal data.

8. The retriever of claim 1, further comprising a ball tray.

9. The retriever of claim 8, wherein the ball tray is aligned axially along a longitudinally-extending centerline axis of the retriever in the collection space and sized to support thereon between one and three balls.

10. The retriever of claim 9, further comprising means for adjusting the height of the ball tray.

11. The retriever of claim 1, further comprising at least one active detent on a sidewall adjacent the collection space.

12. The retriever of claim 11 further comprising at least one active detent on each opposing sidewall adjacent the collection space.

13. The retriever of claim 12, wherein the active detents are solenoids.

14. A tennis ball retriever for retrieving a tennis ball on a tennis court and for controllably releasing the ball during a match between at least two players, said retriever having a fore end and an aft end, comprising
a chassis;
at least one wheel mounted on said chassis;
a drive system coupled to said at least one wheel;
a means for steering the retriever;
a receiver for receiving retriever control signals;
a retriever processor-controller, having inputs for receiving control and data input signals and outputs for retriever command and control signals, said processor-controller being programmed with instructions that upon execution generate output signals based on the input signals for controlling the retriever;
an on-board power supply;
longitudinally-extending sidewalls spaced mutually apart to thereby define a ball collection space therebetween having a width sufficient to receive and release a ball and terminating in a fixed opening at the fore end of the retriever to allow unimpeded ball transit therethrough into and out of the ball collection space during ball retrievals;
an aft ball deflector for deflecting an airborne ball into the ball collection space;
a roof between the ball deflector and the retriever fore end, and wherein the roof includes a longitudinally-extending ball channel to facilitate ball collection and control.

15. The retriever of claim 14, further comprising at least one ball proximity sensor.

16. The retriever of claim 15, further comprising at least one active detent on a sidewall adjacent the collection space.

17. The retriever of claim 16, further comprising an orientation sensor, and wherein the processor-controller further includes a programmed-in tennis court grid map and programmed instructions that upon execution direct the retriever movements during ball collections and releases in accordance with the grid map utilizing orientation signal data.

18. The retriever of claim 14, further comprising a ball tray aligned axially along a longitudinally-extending centerline axis of the retriever in the collection space and sized to support thereon between one and three balls, and wherein said ball tray includes a means for adjusting its height above the court surface.

19. The retriever of claim 14, further including means on at least one ball-impacting surface for dampening and absorbing a ball impact.

20. A tennis ball retrieval system for retrieving and controllably releasing a tennis ball on a tennis court and for controllably releasing the ball during a match between at least two players, comprising:

(i) a retriever having a fore end and an aft end, comprising
a chassis;
at least one wheel mounted on said chassis;
a drive system coupled to said at least one wheel;
a means for steering the retriever;
a receiver for receiving retriever control signals;
a retriever processor-controller, having inputs for receiving control and data input signals and outputs for retriever command and control signals, said processor-controller being programmed with instructions that upon execution generate output signals based on the input signals for controlling the retriever;
an on-board power supply
longitudinally-extending sidewalls spaced mutually apart to thereby define a ball collection space therebetween having a width sufficient to receive and release a ball and terminating in a fixed opening at the fore end of the retriever to allow unimpeded ball transit therethrough into and out of the ball collection space during ball retrievals;
an aft ball deflector for deflecting an airborne ball into the ball collection space; a vertical ball ejector positioned so as to vertically eject a ball from the collection space, said ball ejector including an adjustable guide for directing a ball in a desired direction; and
(ii) a remote control for signaling to and controlling the retriever.

21. The tennis ball retrieval system of claim 20, further comprising a docking station for docking the retriever at a standby location.

\* \* \* \* \*